(12) United States Patent
Jalali

(10) Patent No.: US 9,853,715 B2
(45) Date of Patent: Dec. 26, 2017

(54) BROADBAND ACCESS SYSTEM VIA DRONE/UAV PLATFORMS

(71) Applicant: Ubiqomm, LLC, Rancho Santa Fe, CA (US)

(72) Inventor: Ahmad Jalali, Rancho Santa Fe, CA (US)

(73) Assignee: Ubiqomm LLC, San Diego, CA (US)

( * ) Notice: Subject to any disclaimer, the term of this patent is extended or adjusted under 35 U.S.C. 154(b) by 824 days.

(21) Appl. No.: 14/284,375

(22) Filed: May 21, 2014

(65) Prior Publication Data

US 2016/0105233 A1    Apr. 14, 2016

Related U.S. Application Data

(63) Continuation-in-part of application No. 14/223,705, filed on Mar. 24, 2014.

(Continued)

(51) Int. Cl.
*H04B 7/185* (2006.01)
*H04W 56/00* (2009.01)
(Continued)

(52) U.S. Cl.
CPC .......... *H04B 7/18508* (2013.01); *H01Q 3/08* (2013.01); *H01Q 3/24* (2013.01); *H01Q 3/26* (2013.01);
(Continued)

(58) Field of Classification Search
CPC ... H04B 17/12; H04B 17/21; H04B 17/18504
See application file for complete search history.

(56) References Cited

U.S. PATENT DOCUMENTS

| 3,568,197 A | 3/1971 | Cubley |
| 3,891,985 A | 6/1975 | Olgarden |

(Continued)

FOREIGN PATENT DOCUMENTS

JP    61041979    2/1986

OTHER PUBLICATIONS

Modulate. (1992). Academic Press Dictionary of Science and Technology. Oxford, UK: Elsevier Science & Technology. Retrieved from http://search.credoreference.com/content/entry/apdst/modulate/0.*

(Continued)

*Primary Examiner* — Bernarr E Gregory
*Assistant Examiner* — Fred H Mull
(74) *Attorney, Agent, or Firm* — Roberts Foster LLP

(57) ABSTRACT

The present disclosure describes the system and methods for providing broadband internet access to homes and enterprises using a network of aerial platforms such as drones/UAVs/balloons. The drone communication system is composed of an antenna sub-system, a radio sub-system and a data switching sub-system. Drones form and point beams toward ground terminals in different areas in a space division multiple access scheme. Ground terminals are composed of an antenna sub-system and a radio sub-system. Ground terminals search for the drone from which they receive the strongest signals. Drone and ground terminals comprise of methods and systems to calibrate receive and transmit antenna elements. Drone radio sub-system keeps track of the drone's position and orientation changes and adjust drone's antenna beam accordingly to point to the same location on the ground as the drone moves. Depending on the changes in drone's position and orientation, the drone radio sub-system may switch the antenna aperture and/or the antenna fixture that is used to form a beam toward a specific ground (Continued)

terminal. Drones communicate with the terminals using a space and time division multiple access scheme.

15 Claims, 17 Drawing Sheets

Related U.S. Application Data

(60) Provisional application No. 61/940,805, filed on Feb. 17, 2014.

(51) Int. Cl.

| | | |
|---|---|---|
| *H01Q 3/08* | (2006.01) | |
| *H01Q 3/24* | (2006.01) | |
| *H04W 16/28* | (2009.01) | |
| *H01Q 3/26* | (2006.01) | |
| *H04B 17/10* | (2015.01) | |
| *H04B 17/12* | (2015.01) | |

(52) U.S. Cl.
CPC ....... *H04B 7/18504* (2013.01); *H04B 17/104* (2015.01); *H04B 17/12* (2015.01); *H04W 16/28* (2013.01); *H04W 56/0025* (2013.01)

(56) References Cited

U.S. PATENT DOCUMENTS

| | | | | |
|---|---|---|---|---|
| 5,241,544 A * | 8/1993 | Jasper | ................. | H04L 27/262 370/206 |
| 5,561,434 A | 10/1996 | Yamazaki | | |
| 5,995,494 A * | 11/1999 | Horikawa | ............ | H04W 76/02 370/310 |
| 6,034,634 A | 3/2000 | Karlsson | | |
| 6,281,838 B1 * | 8/2001 | Hong | ...................... | H01Q 3/36 333/139 |
| 6,594,509 B1 * | 7/2003 | Takakusaki | ............ | H01Q 1/246 342/174 |
| 6,873,301 B1 | 3/2005 | Lopez | | |
| 7,095,376 B1 | 8/2006 | Timothy | | |
| 8,190,147 B2 * | 5/2012 | Kauffman | ............... | H04L 45/42 370/316 |
| 8,558,734 B1 | 10/2013 | Piesinger | | |
| 2002/0061730 A1 | 5/2002 | Hart | | |
| 2004/0038658 A1 * | 2/2004 | Gurelli | ................. | H04L 1/0002 455/226.3 |
| 2004/0152480 A1 | 8/2004 | Willars | | |
| 2005/0108374 A1 * | 5/2005 | Pierzga | ............. | H04B 7/18504 709/223 |
| 2005/0243005 A1 | 11/2005 | Rafi | | |
| 2007/0032246 A1 * | 2/2007 | Feher | .................... | H04W 64/00 455/456.1 |
| 2007/0281705 A1 * | 12/2007 | Bosenbecker | ........ | H04W 60/04 455/445 |
| 2008/0117858 A1 | 5/2008 | Kauffman | | |
| 2010/0172299 A1 | 7/2010 | Fischer | | |
| 2010/0273504 A1 | 10/2010 | Bull | | |
| 2010/0284377 A1 | 11/2010 | Wei | | |
| 2011/0286372 A1 | 11/2011 | Taghavi | | |
| 2012/0119953 A1 * | 5/2012 | Hosoya | ..................... | G01S 3/74 342/373 |
| 2012/0202430 A1 * | 8/2012 | Jalali | .................... | H01Q 1/2291 455/63.1 |
| 2012/0235863 A1 * | 9/2012 | Erdos | ...................... | H01Q 3/00 342/359 |
| 2013/0070677 A1 * | 3/2013 | Chang | ................. | G01S 13/9303 370/328 |

OTHER PUBLICATIONS

H. Abbott et al., Land-vehicle navigation using GPS, Proceedings of the IEEE, vol. 87(1), p. 145-162, 1999.*

Modulate. (2011). The American Heritage Dictionary of the English Language. Boston, MA: Houghton Mifflin. Retrieved from http://search.credoreference.com/content/entry/hmdictenglang/modulate/0.*

* cited by examiner

BROADBAND ACCESS SYSTEM VIA DRONE/UAV PLATFORMS

CROSS-REFERENCE

This application claims priority to U.S. Provisional Patent Application No. 61/940,805, entitled: "Broadband Access System Via Drone/UAV Platforms" filed Feb. 17, 2014, and non-Provisional patent application Ser. No. 14/223,705 entitled: "Broadband Access System Via Drone/UAV Platforms" filed Mar. 24, 2014, the contents of which are incorporated by reference in their entirety.

BACKGROUND

Field

The present disclosure describes aspects of a system for broadband internet access using aerial platforms such as drones, UAVs (Unmanned Aerial Vehicles), balloons, airships, robocopters as a platform to relay internet traffic among different types of terminals.

Background

As internet traffic has increased over the years, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as Verizon's FiOS (Fiber Optic Service), and geo-stationary satellite systems such as the ones operated by ViaSat and Hughes Networks. The current broadband access systems have a number of shortcomings. One issue is lack of service in remote and lightly populated areas. Geo-stationary satellites do provide service in remote areas of developed world such as the United States. Poorer areas of the world, however, such as Africa lack adequate satellite capacity.

A notable reason satellite capacity has not been adequately provided in poor regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and high cost of satellites, there is a significant cost to insure the satellite and the launch. Therefore, broadband satellite systems and services are relatively costly and difficult to justify in poor regions of the world. It is also costly to deploy terrestrial systems such as fiber or microwave links in lightly populated regions. The small density of subscribers does not justify the deployment cost.

SUMMARY

The present disclosure describes a system for broadband wireless access communication between ground terminals and a network of one or more drones. The system comprises at least one antenna fixture on each drone that is capable of generating at least one beam toward the ground, forming beams toward terminals located in a wide area on the ground and toward other drones in the network. System further comprises at least one radio sub-system on each drone with a receiver for demodulating and decoding signals received from the ground terminals, a transmitter for modulating data and transmitting the modulated signals to ground terminals through at least one drone antenna, sending at least one pilot signal to ground terminals, and controlling and configuring the drone antenna to form beams in specific directions. System also includes at least one drone switching sub-system to switch data received at the drone from one set of ground terminals to another set of ground terminals.

Furthermore, the system has an antenna sub-system at the ground terminal capable of pointing beams toward specific drones, and a radio sub-system at the ground terminal with a receiver for demodulating and decoding signals received from drones, a transmitter for modulating ground terminal data and transmitting the signals to drones through the ground terminal antenna, sending at least one pilot signal to drones, and controlling and configuring the ground terminal antenna to form its beam in specific direction.

The present disclosure describes drone antenna fixtures containing multiple antenna apertures with each antenna aperture pointed to cover different areas. System comprises detecting changes in drone's position, roll, pitch, yaw orientation and instructing the antenna fixture to accordingly steer the drone beam to point to the same location on the ground, and detecting that the drone's position or orientation has moved enough that the antenna fixture or the antenna aperture that points to a given location on the ground may be switched/handed over to a different antenna fixture or to a different antenna aperture of the same antenna fixture. At least one antenna fixture on each drone is placed to be able to steer a beam toward at least one other drone in the network.

Other aspects of the disclosure describe a ground terminal antenna whose antenna aperture is installed on a structure that can move the aperture in azimuth and elevation directions to approximately point the antenna toward a drone; the antenna aperture has elements with electronic beam forming capability in azimuth and elevation to finely point the beam toward the drone. An alternative ground terminal antenna consists of at least two antenna apertures, with at least one aperture pointed toward lower elevation angles, and at least the second aperture pointed toward higher elevation angles; the antenna apertures are installed on a structure that rotates in azimuth direction only, and each antenna aperture has electronic beam forming capability in azimuth and elevation to finely point the beam toward the drone. The ground terminal antenna aperture has elements that steer beams electronically only in elevation, and azimuth beam steering is achieved only by mechanical rotation of the aperture. In another aspect of the disclosure, the ground terminal antenna aperture has no electronic beam steering capability, and beam steering in azimuth and elevation is achieved by mechanically rotating the aperture in azimuth and elevation axes toward a drone.

Another aspect of the ground terminal antenna fixture comprises a single antenna fixture with multiple antenna apertures, with each aperture facing a different direction in azimuth or elevation, with the ground terminal radio sub-system choosing the aperture that receives the strongest pilot signal from the drone.

Another aspect of the disclosure describes methods and systems for storing a list of drones that are nearer to the ground terminal, so called drone neighbor list, according to drones' pilot strength, storing the drones' locations, and to point the ground terminal antenna toward a drone on the drone neighbor lists. The ground terminal detects the pilot signal from the drone, estimates the pilot signal quality, and compares the measured signal quality to a configured value to determine if the specific drone provides the highest signal quality from among all drones. In another aspect of the disclosure describes systems and methods for the ground terminal to divide the space around the terminal into angular cones, and to search each angular cone for drone pilots. The terminal chooses the angular cone with strongest drone pilot and the corresponding drone as the best drone.

The ground terminal, furthermore, sends messages to a drone to register with the drone network, to send the ground terminal's position information and other configuration parameters to the drone, and to inform the network of the identity of the drone the with which the ground terminal intends to communicate.

Another aspect of the disclosure describes methods and systems for forming multiple drone beams to cover the foot print of the drone, methods and systems for dividing the foot print of the drone into a fixed set of contiguous virtual drone beams, turning a number of the virtual drone beams on and the remaining virtual beams off depending on location of ground terminals during one time interval, and changing the set of beams that are on during different time intervals. Another aspect of the system comprises methods and systems for forming a number of non-overlapping drone beams with adjustable beam centers.

The system describes methods and systems for the drone antenna to transmit a pilot signal through one antenna aperture of one drone antenna fixture toward a reference ground terminal, for the ground terminal to measure at least one signal quality metric of the pilot signal received from the drone, and to send the measured drone pilot signal quality to the drone, and for the drone to update the coefficients of the transmit antenna elements using pilot signal quality measurements received from the ground terminal to optimize at least one signal quality metric of the pilot signal received at the ground terminal from the drone.

Another aspect of the disclosure describes methods and systems for the drone antenna to transmit a pilot signal on each element of the antenna aperture, one element a time, toward a reference ground terminal, for the ground terminal to measure the amplitude and phase of the pilot signal received from the drone, and to send the measured drone pilot signal amplitude and phase to the drone, and for the drone to use the amplitude and phase information received from the ground terminal to calibrate the transmit antenna elements. Furthermore, the system has a receiver at the drone to receive a signal from the ground terminal, and to measure at least one signal quality metric of the received signal, and capability for updating the receive antenna element coefficients based on an optimization criterion.

The system also benefits from the same methods and systems for calibrating transmit and receive antenna elements of the ground terminal as described for the calibration of the drone antenna sub-system. These methods and systems are the same as the ones for drone antenna calibration but with the roles of the ground terminal and drone reversed.

The present disclosure describes a method for providing broadband wireless access communication between ground terminals and a network of one or more drones. The method comprises generating at least one beam toward the ground using at least one antenna fixture on each drone, dynamically forming and steering beams toward specific terminals located in a wide area on the ground and toward other drones in the network. The method further comprises sending at least one pilot signal to ground terminals, and controlling and configuring the drone antenna to steer beams in specific directions.

Furthermore, the system compromises methods to dynamically point beams toward specific drones using an antenna sub-system at the ground terminal, for demodulating and decoding signals received from drones using a radio sub-system at the ground terminal, for modulating ground terminal data and transmitting the signals to drones through the ground terminal antenna, for sending at least one pilot signal to drones, and controlling and configuring the ground terminal antenna to steer its beam in specific direction.

System comprises methods for detecting changes in drone's position, roll, pitch, yaw orientation and instructing the antenna fixture to accordingly steer the drone beam to point to the same location on the ground, and for detecting that the drone's position or orientation has moved enough that the antenna fixture or the antenna aperture that points to a given location on the ground may be switched/handed over to a different antenna fixture or to a different antenna aperture of the same antenna fixture.

Other aspects of the disclosure describe methods for mechanically moving the aperture of the ground terminal in azimuth and elevation directions to approximately point the antenna toward a drone using the ground terminal structure that can move the terminal antenna aperture; and a method for electronic beam forming in azimuth and elevation to finely point the beam toward the drone using elements of the antenna aperture. An alternative aspect of the disclosure comprises methods for pointing one ground terminal antenna aperture toward lower elevation angles, and at least the second aperture toward higher elevation angles, for mechanically rotating the at least two antenna apertures in azimuth direction using the structure on which the apertures are installed, and for electronic beam forming in azimuth and elevation to finely point the beam toward the drone. Another aspect of the disclosure comprises a method for mechanically steering the beam of the ground terminal antenna aperture in azimuth and elevation without any electronic beam forming. Another aspect of the disclosure comprises a method for determining which of the multiple antenna apertures of another aspect of the ground terminal antenna that cover different azimuth and elevation angles has the highest gain toward drone, and switching the ground terminal transmitter and receiver to the chosen aperture.

BRIEF DESCRIPTION OF THE DRAWINGS

Following drawings in conjunction with detailed description help clarify the features and advantages of the present disclosure. In the figures, similar components are identified using the same reference label. Multiple instances of the same component in a figure are distinguished by inserting a dash after the reference label and adding a second reference label.

DETAILED DESCRIPTION

Figure 1:
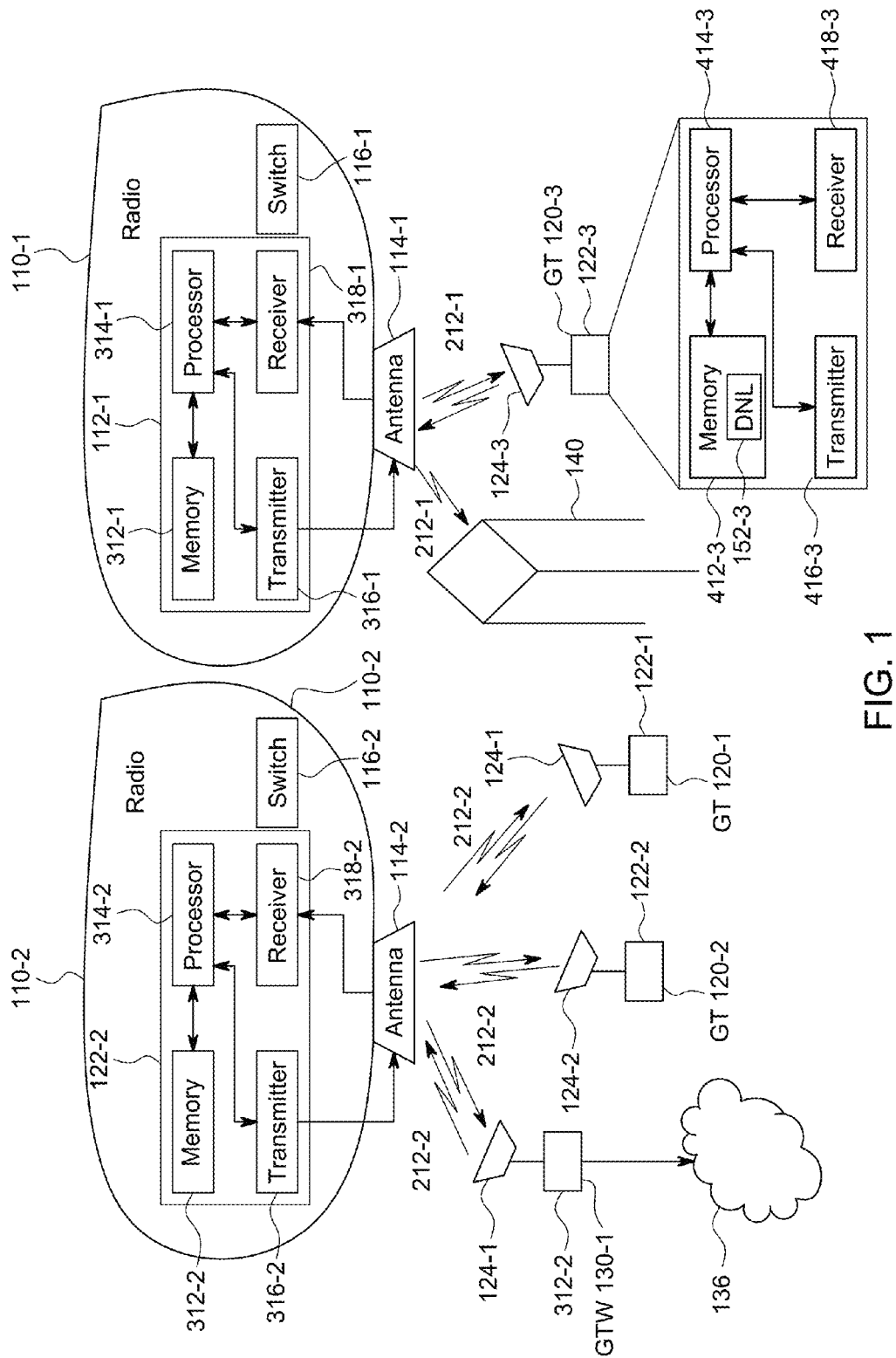
FIG. 1 is a block diagram of a broadband internet access system using drones as the platform.

The FIGURES and text below, and the various embodiments used to describe the principles of the present invention are by way of illustration only and are not to be construed in any way to limit the scope of the invention. A Person Having Ordinary Skill in the Art (PHOSITA) will readily recognize that the principles of the present invention maybe implemented in any type of suitably arranged device or system. Specifically, while the present invention is described with respect to use in broadband wireless access communication between ground terminals and a network therein, a PHOSITA will readily recognize other types of networks and other applications without departing from the scope of the present invention.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by a PHOSITA to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

In view of the challenges and hurdles in both expense and access to remote, poor or otherwise underserved regions, there exists a need for improved broadband access. Accordingly, a system that has much lower hardware cost, has much lower launch/deployment cost, and is more easily scalable is needed.

Until recently drones, also known as Unmanned Aerial Vehicles (UAVs) have been extensively used by military, as well as for some scientific applications such as weather information gathering. Commercial applications of drones/UAVs include package delivery systems, video gathering systems, and a platform for communications. This disclosure describes a communications system design that is optimized for using drones/UAVs as the communications platform. Since drones/UAVs fly at much lower altitudes than satellites do, drone systems do not need the expensive space qualification of the satellite systems. Drones/UAVs also do not need expensive launch systems. Since the drone/UAV hardware cost is relatively small compared to satellites and there is little launch risk, then there is no need or reduced need for expensive insurance. Principles of the present disclosure therefore provide high capacity drone/UAV based broadband communication systems. As such, the relatively low cost of the drone/UAV hardware and operation cost, and its high capacity result in low cost broadband delivery system.

Accordingly, in one embodiment, the UAV is a drone. Throughout the specification drone or UAV may be used interchangeably unless the context clearly indicates reference to the general term, UAV or more specific term, drone. In other embodiments, the UAV comprises a robocopter, propelled by a rotor. Other possible aerial platforms to which the embodiments of this disclosure apply are balloons, blimps, and airships. The drone/UAV may comprise propulsion systems, fuel systems, and onboard navigational and control systems. In one exemplary embodiment the drone comprises a fixed wing fuselage in combination with a propeller, etc. The UAV may carry fuel onboard or function using solar energy. In the remainder of this disclosure we use the terms aerial platform and drone to refer to any of the above mentioned platforms such as drones, UAVs, balloons, blimps, airships etc.

Another advantage of drone/UAV over satellite systems is the low delay of drone/UAV systems. For instance, Geo-stationary satellite have a round trip delay from ground to the satellite and back to ground of about 0.5 seconds which significantly impacts the quality of services that require low round trip delay. Even high altitude drones/UAVs, at say altitudes of 25 kilometers, would have a round trip delay of about 2 msec to terminals on the ground that are about 300 kilometers from the drone. Low delay of drone/UAV based system allows similar real time quality as terrestrial broadband access systems do.

Another major advantage of drones is that they can be deployed one at a time in areas with radius of 300 km or less and immediately provide service to the drone's foot print. Whereas satellite systems need to cover a wide area such as a large part if the CONUS (CONtinental US) in the case of geo-satellite systems, or most of the earth in the case of LEO (Low Earth Orbit) satellite systems before service may be provided. Therefore, drone based systems scale nicely as one can send one drone and start service in its foot print, test the market acceptance of the service, and then send more drones in areas that need service. One could deploy drones in only areas of the country where there is a high demand for the service.

In the description of different sub-systems, label of a generic sub-system is followed by the suffix -j where j is an integer denoting different occurrences of the system sub-system. For instance, 110-j refers to the jth drone, where FIG. 1 shows two occurrences of drones 110-1 and 110-2 for j=1 and j=2. Each drone 110-j has a drone radio sub-system 112-j and at least one drone antenna sub-system 114-j. Drone radio sub-system 112-j consists of 4 sub-systems: the receiver 318-j that demodulates and decodes the signal from antenna sub-systems 114-j; transmitter sub-system 316-j modulates the data received from processor 314-J and sends the resulting signal through the antenna sub-system 114-j; processor sub-system 314-j carries out functions such as configuring the receiver 318-j and transmitter 316-j sub-systems, processing the data received from the receiver 318-j sub-system, determining the data to be transmitted through the transmitter sub-system 316-j, as well as controlling the antenna sub-system 114-j; memory sub-system 312-j contains program code and configuration, and system parameter information that are accessed by the processor 318-j. Each drone also has a drone switching sub-system 116-j. The switching sub-system 116-j may route data received from one GT (Ground Terminal) to another GT in the foot print of the drone, such as from GT 120-1 to 120-2 in the foot print of drone 110-2, if the two GTs are sending data to each other. If a GT's data is destined to the internet then the drone switching sub-system routes data from a GT to a GTW (Gateway), and the GTW routes the data to internet. For example, in FIG. 2 GT 120-3 send its data to drone 110-2, drone 110-2 forwards the data to GTW 130-1 which in turn sends the data to internet 136.

Depending on the altitude of the drone, each drone or UAV may cover an area on the ground with a radius of as small as a few kilometers to at least 200 km, or 400 km or more. Drones communicate with at least two kinds of ground terminals: one type are user Ground Terminal (GT) 120-j, such as terminals at home or enterprises to provide internet connectivity to home or enterprise; second type is what we refer to as the internet Gateway (GTW) 130-j which is connected to the internet. GTs transmit and receive data from the internet using the drone as intermediary. The drone's radio sub-system aggregates traffic received from at least two GTs and may aggregate traffic received from all GTs and sends the aggregated data to the internet via one of the GTWs. Therefore, the GTWs need to provide much higher data rates from/to drones than the GTs do. This implies that the antenna gain of the GTW antenna sub-system needs to be larger than that of the GT, and the GTW transmitter needs to transmit at higher power than the GTs do. Ground Terminal (GT) refers to both types of terminals in describing the system when the design issues being discussed apply to both GT and GTW. When an issue applies exclusively to the GT or to the GTW, then the corresponding term is used.

Similar to drone system, GTs 120-j have two main sub-systems, a ground germinal radio sub-system 122-j, and a ground terminal antenna sub-system 124-j. GT radio sub-system 122-j consists of 4 sub-systems: the receiver 418-j that demodulates and decodes the signal from drone antenna sub-system; transmitter sub-system 416-j modulates the data and sends the resulting signal through the antenna sub-system 124-j; processor sub-system 414-j carries out functions such as configuring the receiver 418-j and transmitter 416-j sub-systems, processing the data received from the receiver 418-j sub-system, determining the data to be transmitted through the transmitter sub-system 416-j, as well as controlling the antenna sub-system 124-j; memory sub-system 412-j contains program code and configuration data, and system parameters information that are accessed by the processor 418-j.

In one embodiment, the drone and GT antennas have high antenna gains to achieve high system capacity. Moreover, a mechanism accurately points the drone and GT antennas toward each other in order to maximize the combined gain from the transmit and receive antennas. The GT antenna sub-system may have high antenna gain to maximize data rate/capacity between the drone and GTs, which means the antenna will be highly directional. Therefore, the antenna may be able to steer its beam, either electronically, or mechanically to point to different drones in order to find the drone from which the GT receives the strongest signal, referred to as the "best" drone hereafter. If the GT antenna sub-system beam is not automatically steerable, then at the installation time a technician may carefully point the GT antenna sub-system beam toward the "best" drone which is a time consuming and costly process. The GT antenna sub-system deployment would be faster and would cost less if the GT antenna sub-system itself steers its beam to find the best drone. Moreover, if the drones change their locations in the sky such as when more drones are added to the network to increase capacity, it is highly desirable for the GT antenna sub-system to steer its beam automatically to the new drone location, or to find the new best drone. If the system is expected to support GTs at low elevation angles of as small as 2°, then it is possible that the path between a GT and its best drone will get blocked at a later time because of new construction. In that event, a GT antenna sub-system system that can automatically (electronically or mechanically) steer its beams and determine a new best drone will not require a technician to visit the GT site to adjust the GT antenna sub-system beam.

GTs are located anywhere in a 360° in azimuth with respect to the drones. Also, the distance from a drone to a GT can be from a few kilometers, i.e. high elevation angles of close to 90° from GT to drone, to as far as 300 km or more, i.e. elevation angle of 2° or less from GT to drone. Therefore, the GT antenna sub-system needs to steer its beam in elevation as well as in azimuth with respect to the drone. We first describe GT antenna sub-system aperture that provides the desired beam toward the drone.

Figure 2A:
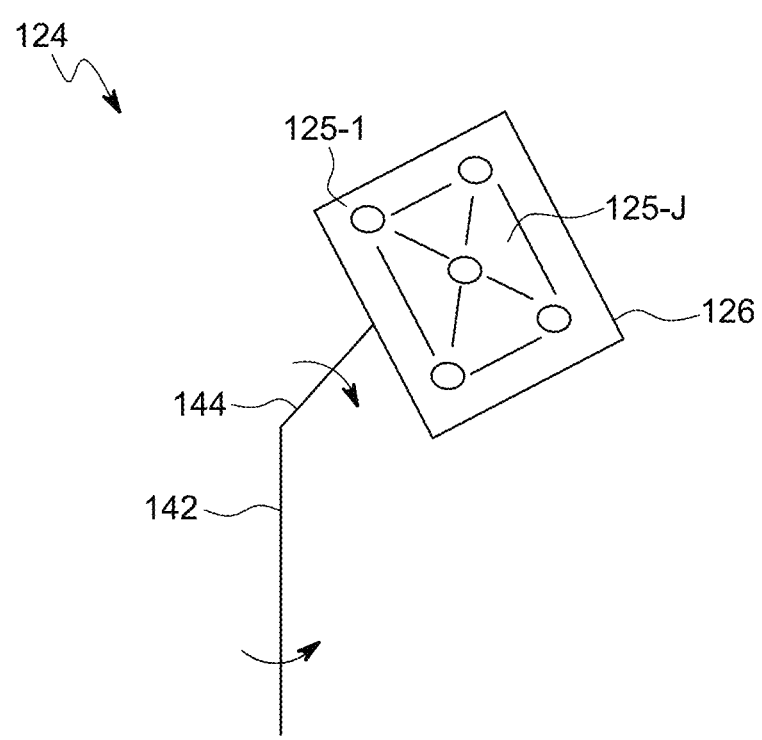
FIG. 2A illustrates different aspects of the ground terminal antenna fixture.

In one aspect of the GT antenna design shown in FIG. 2A, the antenna aperture 126 FIG. 2A is rectangular whose size would be chosen to result in the desired gain. The antenna aperture may have different form factors such as a circle. However, the aperture size is preferentially chosen to achieve the desired gain. Antenna aperture 126 consists of antenna elements 125-j. Antenna elements 125-j can be constructed in two dimensions on the aperture, and can be combined appropriately to steer a beam in azimuth as well as in elevation. Possible antenna element structures are patch, horn, slot structures, CTS (Continuous Transverse Stubs), meta-materials, and other dielectric materials. Antenna elements 125-j and beam steering techniques allow pointing the beam in elevation in a range such as 45° depending on the size of the aperture. In azimuth, the beam can be steered within a limited range of angles such as say within 60°, depending on the size of the aperture. As shown in FIG. 2A, antenna aperture 126 may be rotated in azimuth around the structure 142 and in elevation around structure 144. The mechanical steering in azimuth and elevation is used to approximately point the antenna aperture 126 toward a drone 110-j. The more precise beam steering toward a drone 110-j is achieved by electronic beam forming in azimuth and elevation. In FIG. 2A, the antenna aperture 126 is only slightly tilted up on the holding structure in order to be able to steer the beam electronically in a given range in lower elevation angles. To cover higher elevation angles, the aperture 126 may be mechanically tilted further up to allow electronic beam steering at higher elevation angles.

Figure 2B:
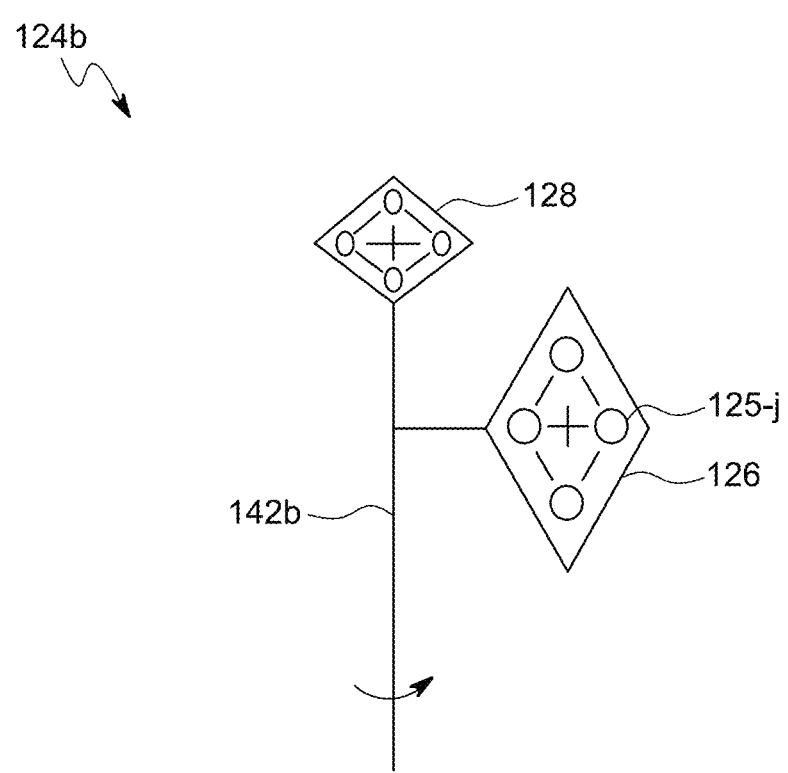
FIG. 2B illustrates another embodiment of the ground terminal antenna fixture.

In another aspect of the GT antenna design, FIG. 2B shows an antenna structure 124b where a second smaller aperture 128b is added on top of the structure. Aperture 128b can be much smaller than aperture 126b because 128b covers higher elevation angles where the distance from the drone to the GT is much smaller, requiring lower antenna gain to close the link. For instance, consider a drone at an altitude of 20 km and horizontal a distance of 300 km from a GT. At the distance of 300 km, the elevation angle from the GT to the drone is about 2°. When the elevation angle from the GT to the drone at altitude of 20 km is 10°, then the distance from the GT to drone is approximately 115 km. The path loss at 14 GHz at a distance of 115 km is about 8.5 dB less than the path loss at a distance of 300 km. This is why the antenna aperture 128b can be much smaller than that of 126b. Therefore, aperture 126b steers the beam at lower elevation angles, and aperture 128b steers the beam at higher elevation angles. To fully steer the beam in azimuth using the antenna structure 124b of FIG. 2B, the structures 142b to which the antenna apertures 126b and 128b are installed may be rotated mechanically around its axis. Further fine tuning of the beams in azimuth and elevation is achieved by applying electronic beam forming techniques to the antenna elements 125-j. The GT radio sub-system chooses the aperture 126b or 128b depending on the elevation angle from the drone to the GT.

Figure 2C:
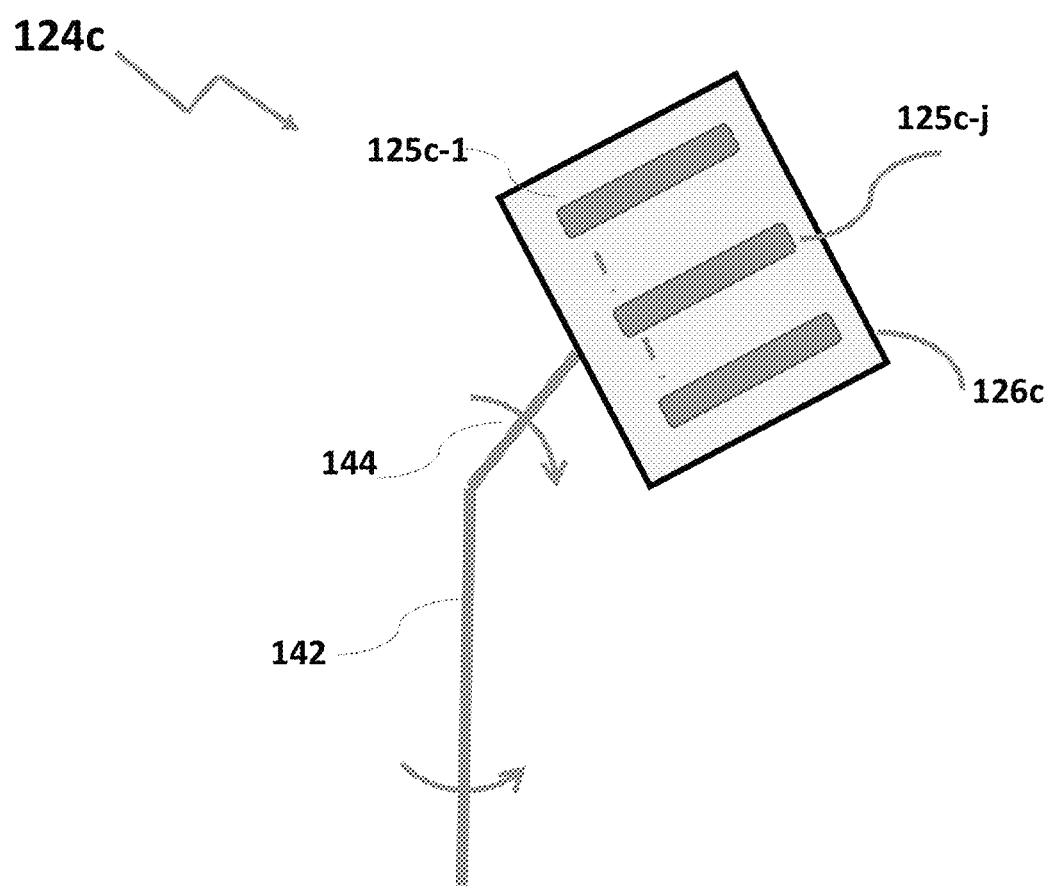
FIG. 2C illustrates yet another embodiment of the ground terminal antenna fixture.

Another aspect of the GT antenna is shown in FIG. 2C, where the antenna elements 125c-j only steer the beam in elevation. In the GT antenna sub-system 124c design, the azimuth beam steering would be fully mechanical using structure 142; this removes the azimuthal electronic beam forming requirement and simplifies the electronics.

Figure 2D:
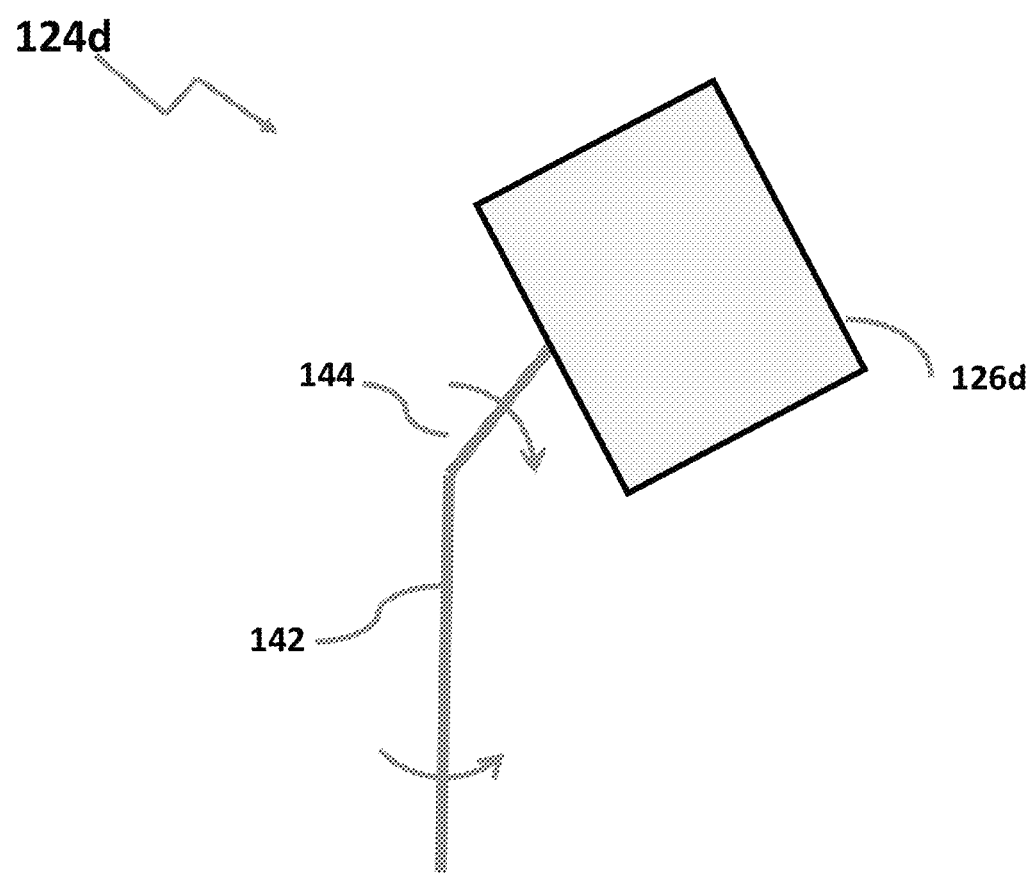
FIG. 2D illustrates a further embodiment of the ground terminal antenna fixture.

Another aspect of the GT antenna is shown in FIG. 2D, where the beam steering is carried out mechanically in both elevation and azimuth. FIG. 2D shows a single antenna aperture 126d attached to structures 142 and 144. Structure 142 rotates along azimuth axis to provide beam steering in azimuth, and structure 144 rotates along the elevation axis to steer the beam in elevation.

Figure 2E:
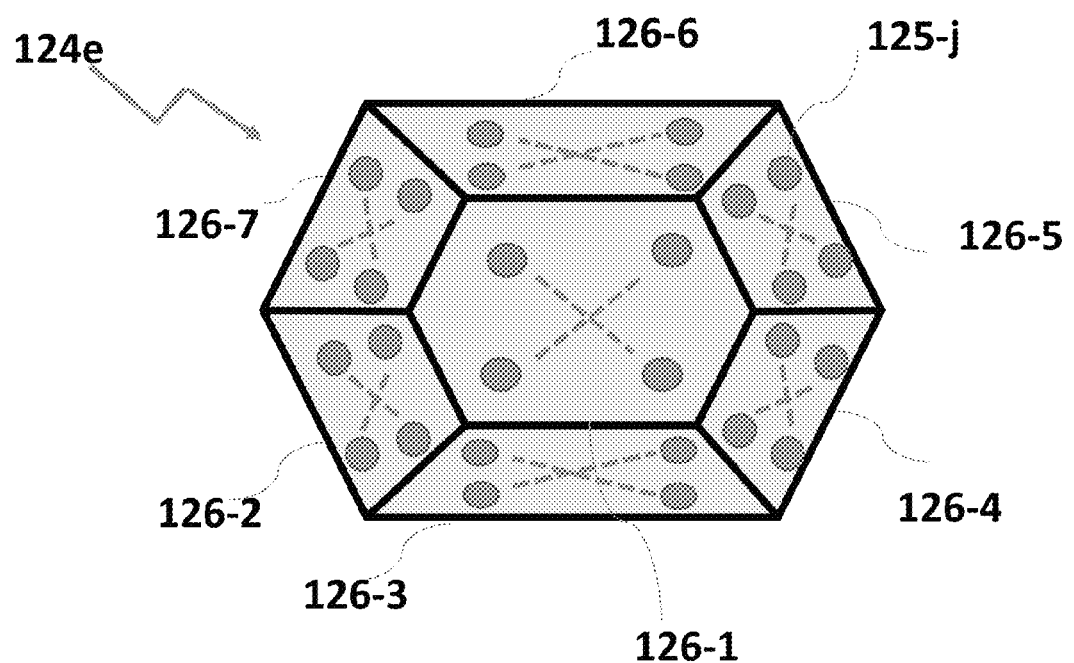
FIG. 2E illustrates another embodiment of the ground terminal antenna fixture.

Another aspect of the GT antenna is shown in FIG. 2E. The antenna fixture 124e of FIG. 2E has multiple apertures, aperture 126-1 facing up to cover very high elevation angles. The other apertures, 126-2 to 126-7 each cover about 60 degrees in azimuth. Note that although only 6 side apertures are shown in FIG. 2E, in practice more sides and a different shape may be used. The structure of FIG. 2E is meant to show on example of an antenna fixtures that covers all 360 degrees in azimuth and elevation using antenna apertures that cover different parts of the azimuth and elevation. This antenna structure does not need any mechanical structure to form high gain beams in all azimuth and elevation directions. The terminal radio sub-system chooses the aperture from which the ground terminals receive the strongest pilot signal from the drone. The terminal radio sub-system may choose the aperture using knowledge of location of the terminal and location of the drone with which the terminal intends to communicate. Alternatively, the terminal receiver may estimate the pilot signal strength received from the drone on each of the antenna apertures and then choose the aperture that receives the strongest signal. In one embodiment this is exemplified as a semi hemispherical shape whose surface is made of the antenna elements and would activate on a section of the semi hemispherical antenna aperture depending on the azimuth and elevation angle to be served.

Figure 3:
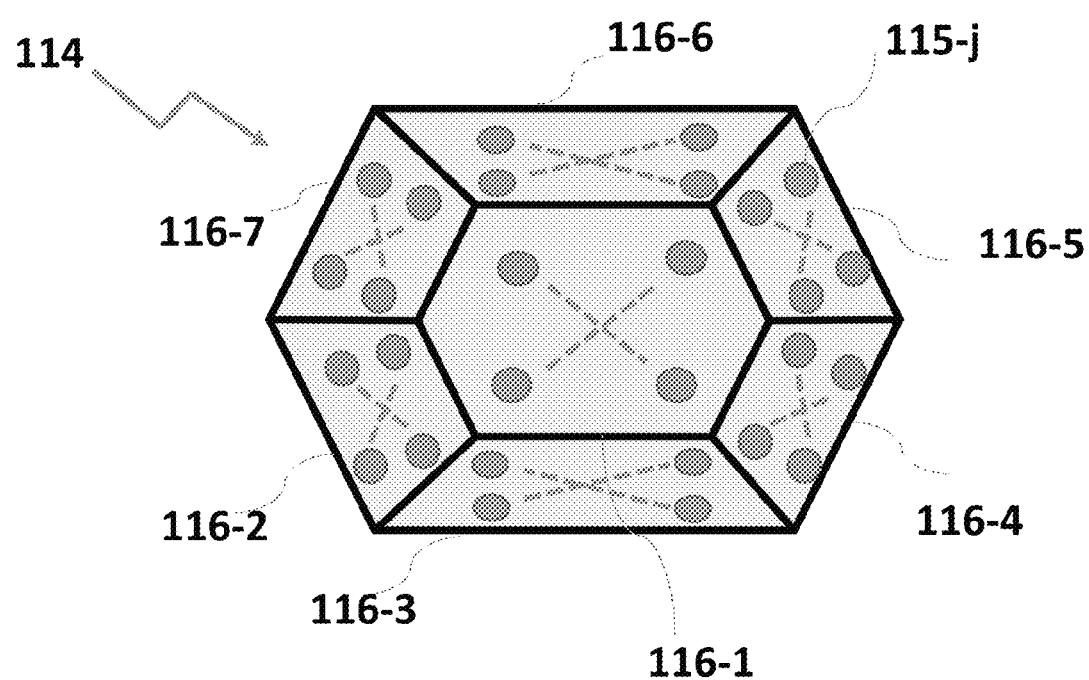
FIG. 3 illustrates a conceptual diagram of the drone antenna fixture.

In another aspect of the disclosure, the drone antenna sub-system design is described, as shown in FIG. 3. First consider the case where only one antenna fixture is installed on each drone. One issue with a single antenna fixture is that the size of the antenna aperture needs to be large in order to scan beams across the coverage area from high elevation angles of 45° or more to low elevation angles of 2°, from the GTs to drones, to avoid significant beam scan loss. The scan loss problem may be mitigated using the antenna fixture structure of FIG. 3. Antenna fixture 114 of FIG. 3 has a central antenna aperture 116-1 which is designed to cover areas that are at higher elevation angles with respect to the drone, i.e. locations close to the drone. Antenna apertures 116-j, j=2, . . . , 7 in FIG. 3, are placed at an angle relative to the central aperture 116-1 in a way to better cover areas that are at low elevation angles and farther from the drone. Antenna fixture of FIG. 3 would be installed under and at the center of the drone with the larger base attached to the drone and the aperture 116-1 looking down. Then, since the apertures 116-2, . . . , 116-7 are tilted toward father distances, they have less beam scanning loss toward lower elevation angles than a single aperture design would have. Each antenna aperture may consist of a number of antenna elements 115-j which are used to electronically form and steer a beam.

Furthermore, as the drone rolls or pitches, some coverage areas on the ground may end up with very poor or no coverage. Single antenna fixture per drone design would result in significant coverage loss as the drone rolls and pitches. Accordingly, the multiple antenna apertures of antenna design in FIG. 3 helps mitigate the beam scanning loss, and helps reduce the overall size of the antenna fixture. Multiple antenna fixture approach mitigates the issues associated with drone pitch and roll.

Figure 4:
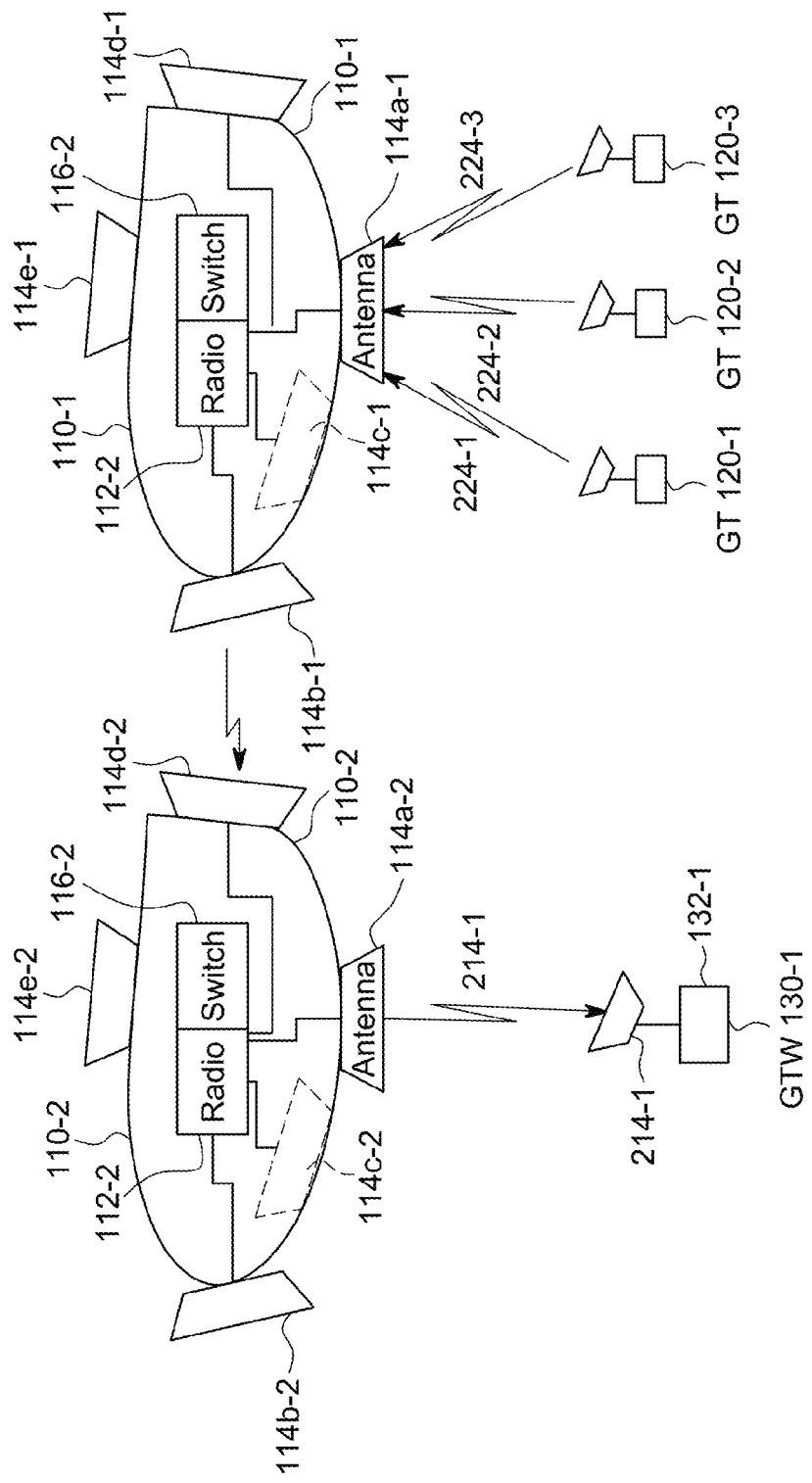
FIG. 4 is a block diagram of a drone based broadband internet access system illustrating the multiple antenna fixture aspect of the drone.

In another aspect of the drone antenna system design shown in FIG. 4, at least two separate antenna fixture 114a and 114c are installed one on each side of the drone. At least two antenna fixtures 114b and 114d are installed, one in front and one at back of the drone. At least one antenna fixture 114e is installed on top of the drone. Antenna fixture 114e will be useful in drone to drone communication when the altitude of different neighboring drones may be different. Note that more than five antenna fixtures 114a-114e may be placed in appropriate locations on the drone. The five antenna fixtures 114a-114e of FIG. 4 demonstrate one example of how one would cover the front, aft and sides of a drone. Then, when the drone rolls, the body of the drone does not block the antenna fixture toward the coverage area. Moreover, the antenna fixture on each side of the drone can still scan a beam to a wide area visible from that side of the drone even as the drone rolls. Nevertheless, as the drone rolls, the beam that is pointed to a certain area on the ground will move which may result in lack of coverage or poor coverage in that area. Therefore, the beam needs to be steered back to the original area which can be done either mechanically or electronically because the area is still visible from the antenna fixture on that side of the drone. Electronic beam steering can repoint the beam faster than the mechanical approach with less loss of data rate during the repointing. A gyroscope is used to estimate the drone roll, pitch, or yaw. Based on the change in the drone's roll, pitch, or yaw, the beam's bore sight is steered to point back to the GT's location on the ground.

Another reason for installing multiple antenna fixtures on the drone is to allow drone to drone communication capability. As mentioned above, each drone needs to communicate with the internet via an internet Gateway (GTW) such as GTW 130-1 of FIG. 4. There may be cases when there is no GTW in the foot print of one drone, say drone 110-1 in FIG. 4. GTs 120-1, 120-2 and 120-3 send their data 224-1, 224-2, and 224-3 to drone 110-1 using the antenna fixture 114a-1 of drone 110-1. The drone 110-1 aggregates the data from GTs 120-1, 120-2 and 120-3 and sends the aggregate data 214-1 from the three GTs from its drone antenna sub-system 114b-1 to drone 110-2 using antenna sub-system 114d-2 of drone 110-2. Drone 110-2 would then send the aggregate data 214-1 from drone antenna sub-system 114a-2 to GTW 130-1 via GTW's antenna sub-system 134-1. GTW 130-1 would forward data 214-1 to the internet. Similarly internet data destined to GTs of drone 110-1 would be sent, via GTW 130-1, to drone 110-2 and then from drone 110-2 to drone 110-1 and then to the GTs in the drone 110-1's foot print.

In order to effectively address further drone system design aspects such as design of drone beams and drone system radio and antenna architecture, we start with an example link budget for the drone system. Table 1 shows the example link budget. The drone PA (Power Amplifier) tx power is preferably chosen such as to reduce the DC power requirement at the drone. Table 1 assumes a PA with 1 dB compression point power output of 10 Watts and 3 dB backoff, resulting in 5 Watts of power into the drone antenna sub-system antenna port. Assuming 25% PA efficiency, the DC power requirement of the PA is about 40 Watts. With C/N of ~11 dB per Table 1, one should be able to achieve a bandwidth efficiency of about 3 bits/second/Hz, i.e. a data rate of about 1.5 Gbps (Giga bits per second) on 500 MHz of bandwidth. With 20 simultaneous beams from the drone to different GTs, one can achieve a total capacity of about 30 Gbps for one drone consuming 800 Watts of DC power (20 PAs at 40 Watts each). This is just an example and should not be construed as limiting, but it demonstrates the tradeoff that should be considered in choosing the PA power, number of beams, total capacity, and the total DC power requirement. One conclusion that may be readily made is that the antenna gain of drone antenna sub-system needs to be reasonably high, say 28 dB per Table 1 or more, in order to keep the DC power requirement of the drone within acceptable limits. For instance, if the drone antenna gain is reduced by 5 dB and the EIRP is compensated for by increasing the PA tx power, then the total DC power requirement of the drone for 20 PAs at 25% efficiency goes up to more than 2.5 kWatts which would have a major impact on the size of the batteries and solar panels for the drone. Another aspect of this disclosure describes how many beams are formed and how the beams are managed to cover all GTs in the foot print of a drone. One question is the number of simultaneous beams that one antenna fixture of drone would form. If the antenna fixture forms N beams simultaneously, then the input to the PA attached to each antenna element will be the sum of N waveforms, one for each of the N beams; this results in a high peak to average signal which requires the drone PA to be backed off by as much as 10 dB to avoid distortion of the signal and spectral regrowth into adjacent bands. Backing off the PA by as much as 10 dB will result in very inefficient use of the PA power, which in turn requires high DC power from the drone battery system. If the drone antenna fixture only forms one beam at a time, then the waveform may be designed to have low peak to average and to significantly reduce the DC power requirement. A disadvantage of forming a single beam at a time using one antenna fixture is that one would need as many antenna fixtures as simultaneous beams, i.e. then the number of required antenna fixtures on the drone is equal to the number of required simultaneous beams.

TABLE 1

Drone to ground terminal (downlink) link budget.

| | | | |
|---|---|---|---|
| Boltzmann constant | 1.38065E−23 | | |
| Temp | 290.00 | | |
| Thermal noise | −203.98 | dBW/Hz | |
| GT noise figure | 4.00 | dB | |
| Noise floor/Hz | −199.98 | dBW/Hz | |
| Drone Tx power | 5.00 | W | Assumes 3 dB backoff from peak PA power |
| Drone Tx ant gain | 28.00 | dB | 0.2 dish at 14 GHz & 75% antenna efficiency, ~6.5° 3 dB BW |
| Drone EIRP | 34.99 | dBW | |
| BW | 500.00 | MHz | |
| Drone EIRP/Hz | −52.00 | dBW/Hz | |
| GT Rx ant gain | 31.50 | dB | 0.3 dish at 14 GHz & 75% antenna efficiency, ~4.3° 3 dB BW |
| Distance | 300.00 | km | |
| Frequency | 14.00 | GHz | |
| Path loss | −164.90 | dB | |
| Atmospheric loss | 3.00 | dB | |
| GT C/N | 11.57 | dB | |

The choice of having the drone antenna fixture generate only one beam at a time versus multiple simultaneous beams depends on the relative benefit of much lower DC power versus the need for multiple antenna fixtures. The objective is to reduce overall drone cost. To reduce cost, weight of the drone payload and component costs need to be reduced. Multiple simultaneous beams forces each PA to be larger by as much as 10 dB, which in turn implies more DC power for the PAs versus a single beam case. Larger PAs require a larger enclosure to take care of the heat which implies more weight. Higher DC power also requires larger batteries, and therefore larger solar panels to recharge the batteries which also imply more weight. Heavier payload on the drone will in turn increase the drone vehicle size and cost. In the example discussed above with 20 simultaneous beams, even if each antenna fixture were to form multiple simultaneous beams one would still need at least four antenna fixtures in order to mitigate drone roll, pitch and yaw toward the ground terminals as discussed above, one to each side of the drone, one in front and one in the back. The fifth antenna in FIG. 4 on top of the drone does not cover the ground terminals and is for drone to drone communication. Therefore, a drone system where each antenna fixture only forms one beam would need 5 times as many antenna fixture as the one which uses four fixture with 5 beams in each fixture. It should also be noted that when only 4 antenna fixtures are used, then each antenna aperture needs to be larger than when 20 fixtures are used because with smaller number of antennas each antenna has to scan a wider area. If a wider area needs to be scanned then there will be higher antenna scan loss. To reduce the antenna scan loss one would need to use a larger antenna aperture size and/or a more complex antenna fixture design. In other words, each of the antennas in the 4 fixture case is expected to be larger and weigh more than each of the antennas in the 20 antenna fixture case. Therefore, it is likely that a system where each antenna only forms one beam at a time will weigh and cost less than a system where each antenna forms multiple simultaneous beams. A complete hardware design as well as evaluation of parts' weight and cost is needed to choose the right number of antennas.

An aspect of the disclosure regarding beam design and management for the drone system is discussed next. In one aspect of drone beam design and management, the drone antenna fixtures form a contiguous set of beams that cover the foot print of the drone. In order to minimize interference at the edge of adjacent beams, a frequency reuse scheme whereby adjacent beams use different frequencies may be employed. The available frequency band would be divided into a number of frequency channels, and the different frequency channels would be assigned to different beams according to some frequency reuse pattern. Each ground terminal would receive/transmit data from/to the drone on a certain frequency channel and time slots, i.e. an FDM (Frequency Division Duplex) or TDM (Time Division Duplex) manner. Below, a number of alternative drone beam construction and management will be discussed.

A 3 dB beamwidth of 6.5° for the drone antenna example of Table 1 implies that the diameter of the 3 dB beam on the ground at a distance of 300 km from the drone is about 34 km. If these beams are placed next to each other at 3 dB beamwidth points, then it is easy to see that about 55 beams would cover the circumference of a circle with radius 300 km. For smaller distances from the drone, the required drone antenna gain reduces due to smaller path loss, and the corresponding antenna 3 dB beamwidth becomes larger. Taking into account the fact that beams get larger at closer distances to the drone, one can compute that to achieve the link budget of Table 1 more than 300 fixed beams are needed to cover the foot print of the drone with radius of 300 km. Therefore, if the drone beams are not steerable to the location where the GTs are, i.e. if the drone antenna sub-system beams are fixed on the ground, then one needs as many as 300 beams for the above example. Forming 300 beams will require a large amount of electronics which will increase the weight, power consumption and size of the antenna system. It is true that if 300 beams are formed and all 300 beams carry traffic then the resulting system will have a large amount of capacity, but the required drone DC power and the antenna system size and complexity would be excessive. Let M be the number of beams that are needed to fully cover the foot print of the drone. As mentioned above M may be as large as 300 or more depending on the desired foot print of a drone. In order to contain the system complexity, the drone would be designed to support a much smaller number of beams N than the number M defined above. However, with say only N=20 beams in an area that needs say M=300 beams for full coverage, one cannot simultaneously cover the entire foot print of a drone. A mechanism for time sharing the drone's N available beams among the GTs in the foot print of the drone is needed.

Figure 5A:
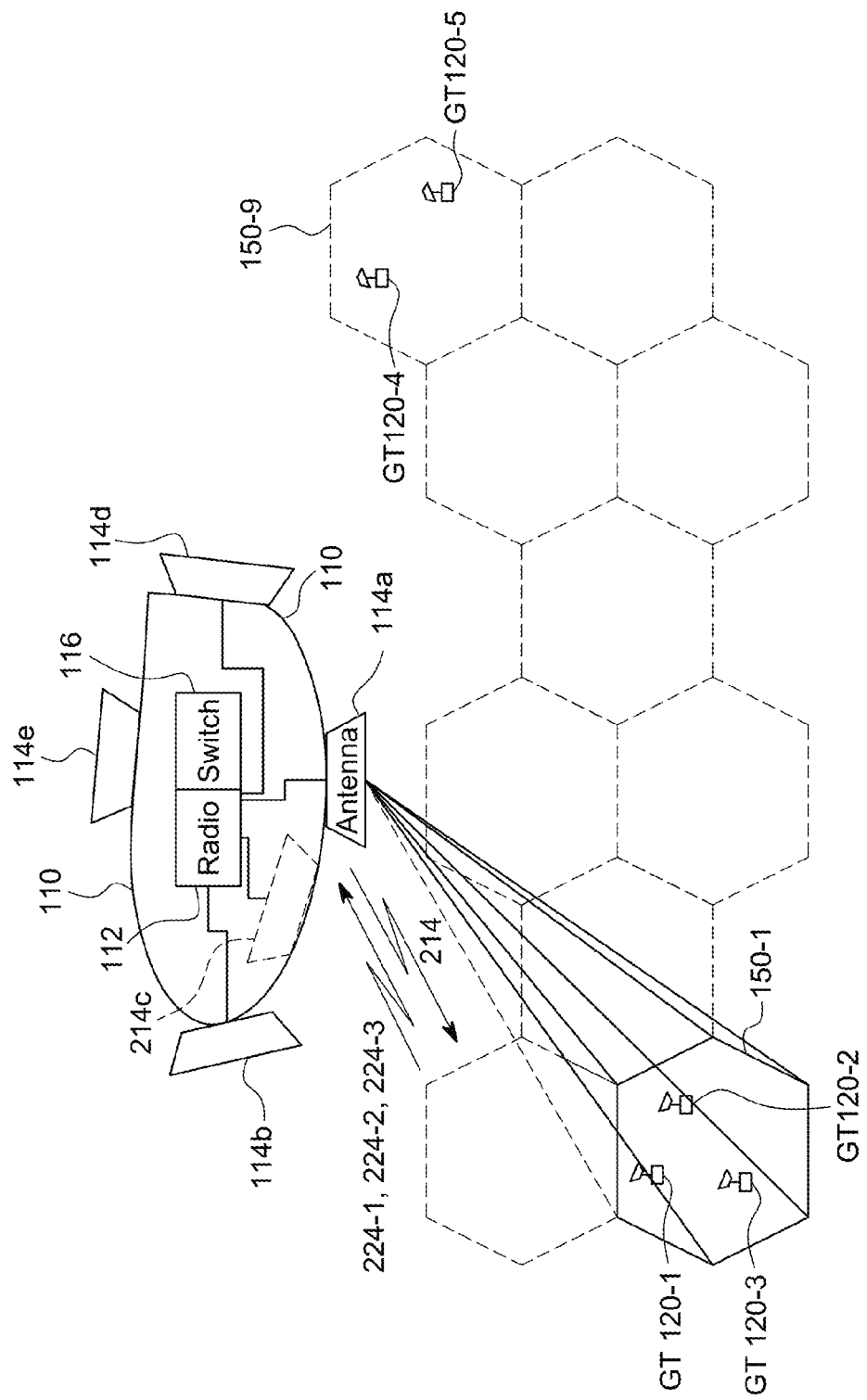
FIG. 5A illustrates one aspect of managing drone beams over the coverage area of foot print of the drone.
Figure 5B:
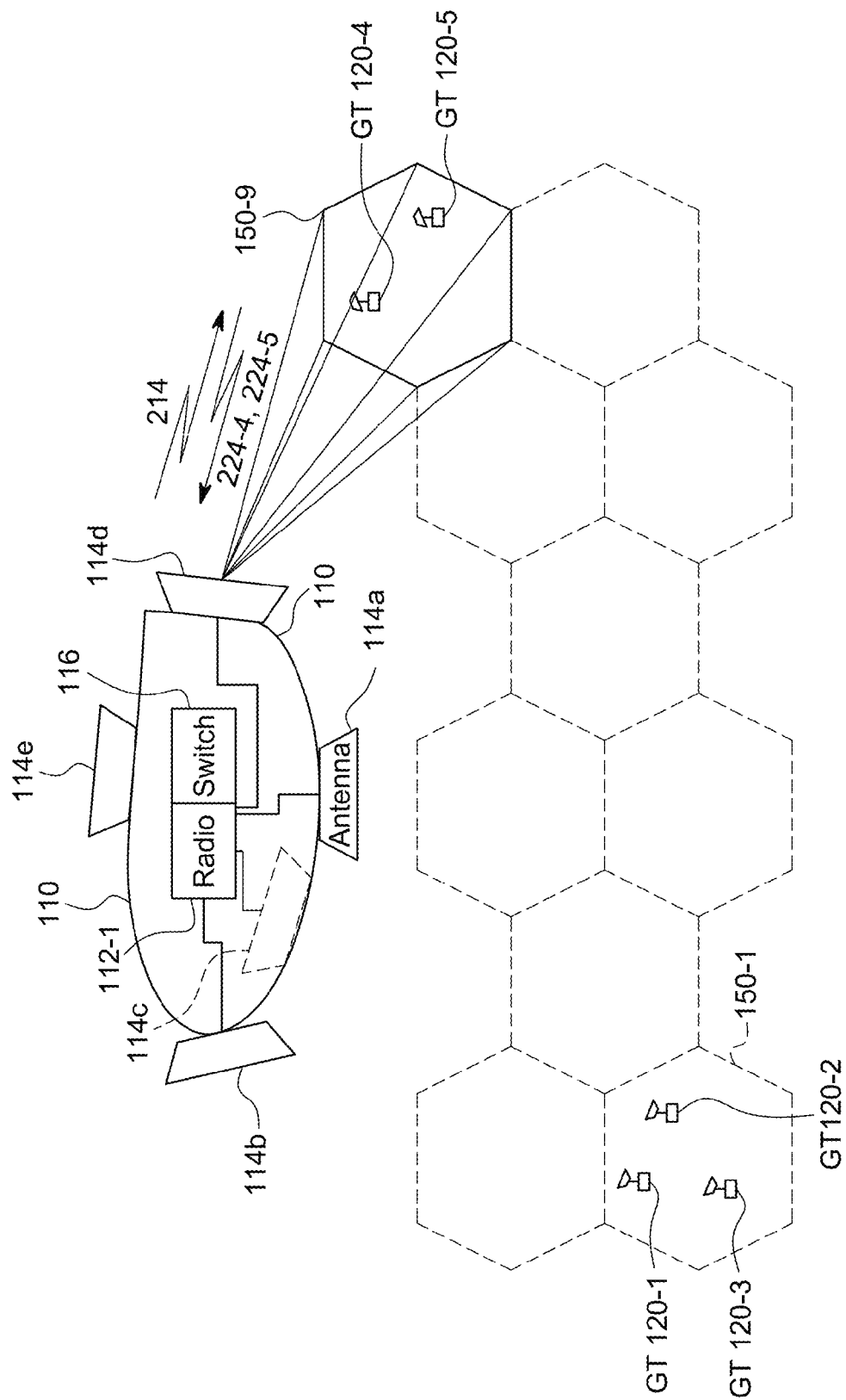
FIG. 5B illustrates another aspect of managing drone beams over the coverage area of foot print of the drone

In one aspect of drone beam design and management, M virtual beams are specified such that they would fully cover the footprint of the drone. Drone radio and antenna sub-systems form only N<M active beams at a time, and place the N active beams in the position of some of the virtual beam locations where there are GTs to be served. In other words, only N out of the M beams are turned on at a given time (active beams), and the other M–N virtual beam are off. The drone radio sub-system serves GTs in the coverage area of the N active beams during a number of high data rate time slots. Then, these N beams are turned off, and N other beams among the M virtual beams, in possibly different locations than the previous active beams, are turned on/made active. For instance, in case of N=1 of FIG. 5A, and M=10, drone radio sub-system 112 turns on beam 150-1, hexagonal area shown in solid line. Drone 110 send data stream 124 to GTs 120-1, 120-2 and 120-3 during a number of high data rate time slots on the downlink (drone to GT direction). GTs 120-1, 120-2 and 120-3 send data streams 224-1, 224-2 and 224-3 to drone110 during a number of high data rate time slots on the uplink (GT to drone direction) as will be described in more detail in later parts of the disclosure. Next, as shown in FIG. 5B, drone radio sub-system 112 then turns off beam 150-1, hexagonal area shown in dotted line, and turns beam 150-9 on and transmits/receives data to/from GTs 120-4, 120-5.

Another aspect of communicating with GTs using a number of beams, N, which only partially cover the foot print of the drone which needs M>N beams for full coverage, generates N beams at a time and moves the N beams dynamically to locations where there are GTs. At a given time, drone forms N beams over N different locations with GTs. After transmitting/receiving to/from the GTs in the N beams, the drone deactivates the previous N beams, and forms N beams at N new locations with GTs to serve. The advantage of this approach over the one described above is that it can more optimally place the beams. However, the antenna sub-system beam forming coefficients need to be computed anew for each new set of beams, whereas the previous approach uses pre-computed beam forming coefficients. The two approaches are very similar, with some differences in beam forming coefficient calculation.

In another aspect of the disclosure, GTs are served in a Time and Space Division Multiplex Access (TSDMA) scheme as the drone radio sub-system points the beam to a few GTs that are close together, serves the GTs in that location during a few high speed time slots in a Time Division Multiplex (TDM) manner, and then moves the beam to a different location in a Space Division Multiplex (SDM) manner to serve the GTs in the new location in TDM fashion.

Certain downlink time slots on each downlink FDM channel are dedicated to common signaling, referred to as Downlink Common Signaling Time Slots (DCSTS). DCSTS carries system parameter messages, uplink reservation request grants, acknowledgments for uplink packets, and information on uplink channel signal quality such as SINR (Signal to Interference plus Noise Ratio). As will be discussed later, GTs need knowledge of uplink signal quality such as uplink received SINR at the drone in order to determine the highest data rate GTs may transmit on the uplink to the drones. The remaining downlink time slots are Dedicated Downlink Data Time Slots (DDDTS) used to send data to GTs. When a beam is placed on a group of close by GTs such as GTs 120-1, 120-2 and 120-3 of FIG. 5A, the drone radio sub-system may multiplex data 214 destined to the multiple GTs in the beam 150-1's coverage area into one DDDTS, referred to as a multi-user time slot, or to send data 214 to the different GTs in different DDDTS, referred to as single user time slots. Each DCSTS or DDDTS contains a known reference signal also referred to as the downlink pilot signal. GTs search for the downlink pilot signal sent from the drone radio sub-system, and once they acquire the downlink pilot signal, the GT radio sub-system starts decoding the time slots of DCSTS and DDDTS.

In one aspect of the disclosure, multiple frequency channels are used on the downlink in each beam in an FDM (Frequency Division Duplex) fashion. Each FDM frequency channel may be assigned to one ground terminal or a number of ground terminals may be served on each FDM channel in different time slots in a TDM fashion (Time Division Duplex) as also was mentioned above. An alternative approach would be to use a single wideband frequency channel in each beam. A single wideband signal on the downlink with low peak to average waveform design makes more efficient use of the PAs at the drone. On the uplink (GT to drone) direction the available bandwidth may be divided into smaller Uplink Frequency Channels (UFC). Most of these UFCs are assigned to be Uplink Dedicated Data Channels (UDDC) where GTs transmit their data to drone with prior reservation. One of the UFCs is designated to be the Uplink Common Signaling Channel (UCSC), on which GTs send registration messages, requests for uplink UDDC reservation, acknowledgments for downlink data packets, downlink signal quality measurements such as downlink SINR, and other signaling messages to the drone radio sub-system. GTs request UDDC by sending a request on the UCSC. The request's grant is sent to the GTs in the DCSTS. The UCSC may also be used to send small data packets for bursty traffic where the data packet is not long enough to merit the overhead needed to reserve a UDDC.

An alternative to dividing the uplink frequency into smaller channels, i.e. UFCs, and assigning each UFC to a different GT, is to share a single wideband channel on the uplink and to assign different time slots on the uplink to different GTs based on a slot reservation mechanism. Certain uplink time slots are dedicated to be Uplink Common Signaling Time Slots (UCSTS), the remaining time slots are dedicated for uplink data transmission referred to as Uplink Dedicated Data Time Slots (UDDTS). Reservation grants for UDDTS time slots are sent to the GTs on the DCSTS. Note that since GTs are spread in an area of radius 300 km or more, different GTs will have relative one way delay of as much as 1 msec or more. Therefore, in order to avoid having uplink time slots received at the drone from different GTs from overlapping in time, different GT's uplink transmissions need to be adequately delayed with respect to the largest one way delay. UCSC or UCSTS is a random access channel such as Aloha, slotted Aloha, or CDMA (Code Division Multiple Access) Aloha channel.

Since the GT and the drone generally use high gain directional antennas to achieve high data rates, the propagation between the two antennas is line of sight (LOS); furthermore, there is practically no signal fading due to multipath. However, as the drone rolls and pitches, the drone antenna gain may change due to change in drone orientation. Moreover, as the drone travels around a circle in it quasi-stationary position, the antenna that is serving a GT will change its orientation toward the GTs and therefore its gain will change. Furthermore, atmospheric changes such as rain and snow will cause additional signal attenuation. The drone antenna gain variation during drone's different movements will, however, be on the order of seconds and will also be on the order of a few dBs. In other words, the change in the signal strength from drone to the GT and vice versa is relatively slow, i.e. a few dBs and over seconds rather than a few dBs over msec. Rain attenuation will also change slowly with time during the period when it rains. However, since the SINR that the GT or the drone will receive will vary a few dBs with time, then in order to maximize the system capacity the data rate at which the GT or drone transmit may be chosen to be the highest possible for the SINR at the receiver. The GT radio sub-system makes a SINR estimate from the downlink pilot signal. The GT radio sub-system sends to the drone radio sub-system a Downlink Data Rate Index (DDRI) value which is the index of the highest data rate that the GT radio sub-system can decode with high probability on the downlink for the measured downlink SINR. The DDRI is either sent on the UCSTS/UCSC or piggybacked onto a data packet on the UDDTS. The drone radio sub-system similarly makes measurement of SINR received on the uplink from GT and sends an Uplink Data Rate Index (UDRI), which is the index of the highest decodable data rate on the uplink for the measured SINR, to each GT on the DCSTS or piggybacked on a data packet on the DDDTS.

In one aspect of this disclosure, during initial GT installation or sub-sequent drone network changes, the GT should find the drone from which it can receive the strongest signal and register with the system by sending a registration message, GT's location, and certain system parameters to the chosen drone. The GT is assumed to either have a GPS receiver which is able to find the GT's location coordinates, or that the person installing the GT inputs the GT's location coordinates manually. GT radio sub-systems have a list of neighboring drones in the network, referred to as the Drone Neighbor List (DNL) 152-j. DNL contains the position of drones as well as an estimate of the signal quality metric such as SINR (Signal to Interference plus Noise) that is expected to be received from each drone in Line Of Sight (LOS) propagation conditions. LOS is the condition when there are no obstructions such as buildings, hills or trees between the drone and the GT. DNL 152-j for a GT radio sub-system 122-j is sorted in decreasing order of signal strength. Each drone 120-j sends a downlink pilot signal as part of the DCSTS 212-j from which all GTs estimate the signal quality on the received pilot signal. GT radio sub-system 122-j searches for the drone 110-k from which it receives the strongest downlink pilot signal referred to as the "best" drone. A GT radio sub-system 122-j can receive the strongest signal from the drone at the top of the DNL 152-j in LOS conditions. However, if there happens to be some obstruction, such as building 140 in FIG. 1, between the GT radio sub-system 122-j and the drone at the top of the DNL, then the drone at the top of DNL 152-j may not be the one from which the GT radio sub-system 122-j will receive the strongest signal. Therefore, as will be discussed later, a mechanism is needed for each GT radio sub-system to measure the pilot signal received from the drones on the DNL and to find the "best" drone. Drone's radio sub-system ensures that every certain time period T, every area in the foot print of the drone has been illuminated by the drone's DCSTS/pilot signal. In every T second period, many areas in the drone's foot print will be illuminated because there are registered GT's in those areas that the drone serves. The drone radio sub-system keeps track of all areas it has illuminated during the time period T, and then will illuminate the remaining areas long enough for the new GTs to detect the drone radio sub-system's signal and to register with the drone.

To estimate the LOS pilot signal strength received at a specific GT 120-j from each drone 110-k on the DNL, the gain of the GT and drone antennas when optimally pointed at each other, as well as the propagation path loss between the drone and the GT, may be calculated. When the drone and GT antennas are directional, then, unless there is an obstruction between the two, the propagation path loss between the two follows the free space propagation model with path loss exponent of 2. Therefore, in most cases the GT 120-j should communicate with the drone 110-k that it is closest to it except when: there is an obstruction in the path of the closest drone; or the antennas of the drone and the GT have relatively low combined gain at the specific GT and drone locations. Therefore, in order for the GT radio sub-system 122-j to determine the "best" drone 110-k in the sense explained above, GT radio sub-system 122-j should have knowledge of the antenna gain pattern of the GT antenna sub-system 124-j and drone antenna sub-system114-k when optimally pointed at each other. GT radio sub-system 122-j computes the expected received signal strength from pilot signal 212-k of drone 110-k using the antenna gain values and free space propagation loss between the drone110-k and the GT 120-j. However, the estimated drone pilot signal strength will deviate from the LOS estimate if there is an obstruction between the drone 110-k and GT 120-j such as building 140 between GT 120-1 and drone 110-1 in FIG. 1. Initially, the GT radio sub-system 122-1 points to the drone at the top of the DNL 152-1 which happens to be drone 110-1 in FIG. 1. GT radio sub-system 122-1 then directs GT 120-1's antenna sub system 114-1 to point to drone 110-1, and searches for the DCSTS/pilot signal 212-1 that is sent by drone radio sub-system 112-1 and measures its signal quality such as SINR. Since the measured 212-1 signal strength is considerably smaller than the LOS estimate value on the DNL, the GT radio sub-system 122-1 searches for the drone 110-2's DCSTS/pilot signal 212-2. GT radio sub-system 122-1 then directs the antenna sub-system 124-1 of GT 120-1 to point toward drone 110-2, and repeats the above process of detecting and estimating the signal strength of the pilot signal 212-2 of drone 110-2. Since GT 120-1 has a LOS to drone 110-2, the pilot signal 212-1 measured signal strength is close to the LOS estimate on the DNL 152-1 and GT 120-1 chooses drone 110-2 as the "best" drone to communicate with. In the case of GT 120-3, drone 110-1 which is at the top of the DNL list of GT 120-3 is also the "best" drone for GT 120-3 due to lack of obstruction between GT 120-3 and drone 110-1. GT radio sub-system 122-3 measures pilot signal 212-1 from drone radio sub-system 122-1 and since the measured drone pilot 212-1 signal strength is close to the LOS estimate on the DNL 152-3, the GT 120-3 chooses drone 110-1 as the "best" drone to communicate with.

In general, a GT may have to repeat the procedure described above for two drones with a number of drones until the drone with the strongest received DCSTS/pilot signal is found. Note that if the path from a GT to a drone is completely blocked, then the GT may not be able to detect the DCSTS/pilot signal from the drone. If after a certain time period the GT radio sub-system does not detect the DCSTS/pilot signal from the drone to which it is pointing its beam, the GT radio sub-system then points the GT antenna sub-system's beam toward the next drone in the DNL as described above.

An approach to the ground terminal determining the best drone which does not use knowledge of drone locations is described next. Each drone sends a distinct pilot signal that covers the whole foot print of the drone so that it may be received by any ground terminal in the drone foot print. The ground terminal radio sub-system divides the azimuth and elevation angles of the semisphere around the terminal into a set of angular areas. The ground terminal points its beam in the center of each angular area and searches for pilot signals sent by the drones. If a drone pilot signal is detected, then the ground terminal radio sub-system records the strength of the detected pilot signal. The ground terminal sequentially searches all angular areas on the semisphere around the terminal. Once all angular areas are searched, then the terminal radio sub-system determines the angular area from which it receives the strongest drone pilot signal chooses the corresponding drone as the best drone, and points the ground terminal beam toward that area.

Once GT radio sub-system has determined the best drone to communicate with per above procedure, it then sends a registration message to the drone radio sub-system as mentioned previously. Registration message includes the GT position coordinates, as well as other pertinent information. The registration message is sent on the Uplink (GT to drone) Common Signaling Channel (UCSC) or the Uplink Common Signaling Time Slot (UCSTS). Drones send their position location coordinates on a downlink common signaling channel to all beams so the ground terminals may use the drone position updates to keep their beams focused on the drone as the drone may move in a small area. Another aspect of ground terminal tracking the drone involves the ground terminal making small perturbations to its beam's bore sight, and making drone pilot signal measurements for each beam position perturbation. The ground terminal antenna sub-system uses the drone pilot strength measurements in different beam perturbation positions to determine the best terminal antenna beam position.

Figure 6:
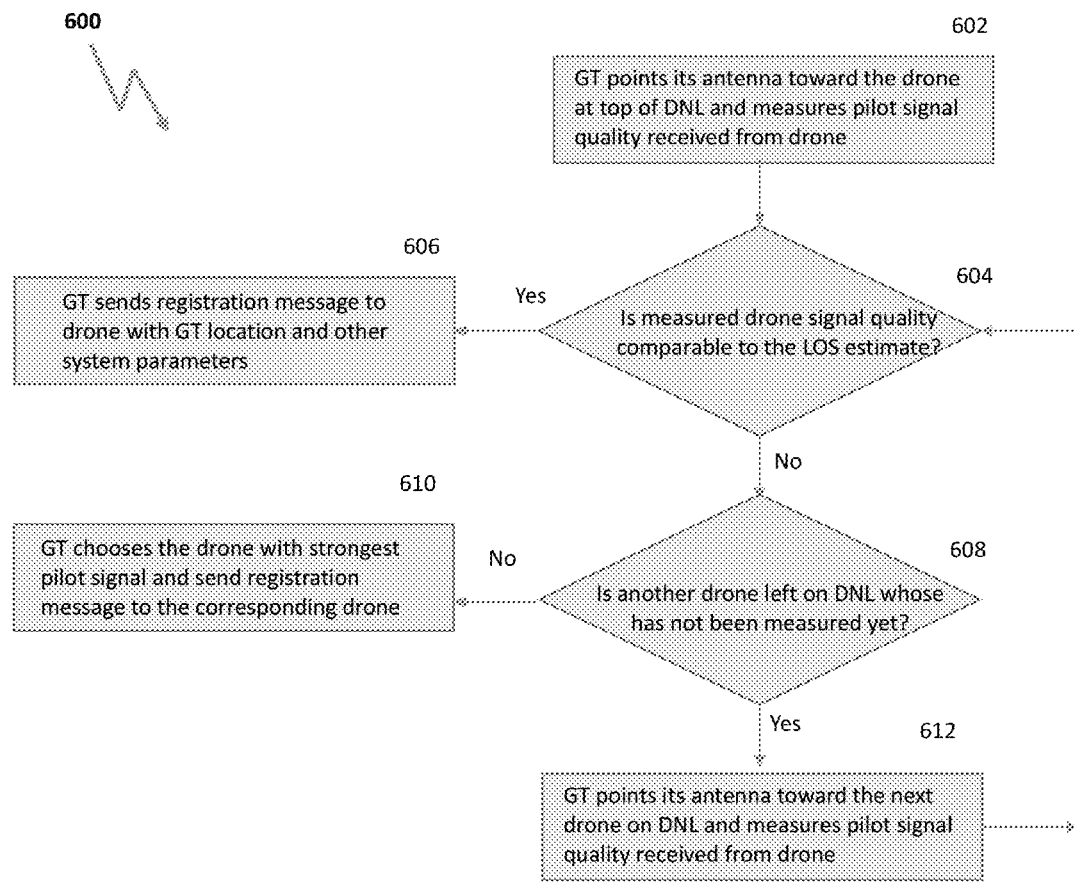
FIG. 6 shows the process used by ground terminals to find the drone from which they receive the strongest signal.

FIG. 6 shows the flowchart that describes the method the GT radio sub-system uses to determine "best" drone in the sense described above. Recall that the "best" drone for a GT is the one from which the GT receives the strongest pilot signal. In step 602, the GT radio sub-system points GT antenna sub-system toward the drone at the top of the DNL and measures the drone pilot signal strength. In step 604, if the measured pilot signal quality is comparable to the LOS estimate of the next drone on the DNL then GT radio sub-system moves to step 606 and sends a registration message to the drone at the top of the DNL. Otherwise the process continues to step 608. Step 608 checks if there is a drone left on the DNL whose signal has not been measured yet. If no drone is left, then the process moves to step 610 and GT radio sub-system chooses the drone with strongest measured pilot signal and sends a registration message to the corresponding drone. Otherwise, the process moves to step 612 where GT radio sub-system points the GT antenna toward the next drone on the list and measures the pilot signal strength of the corresponding drone. The process moves back to step 604.

A mechanism is needed to calibrate the drone antenna sub-system and the GT antenna sub-system so that they point the bore sight of their beams at the desired location on the ground or toward the drone. The advantage of real time calibration is that all artifacts such as the interaction of the antenna and body of the drone, any environmental effects, aging, temperature etc. can be automatically calibrated out. Lab calibration cannot account for many artifacts faced in the actual deployment.

Figure 7A:
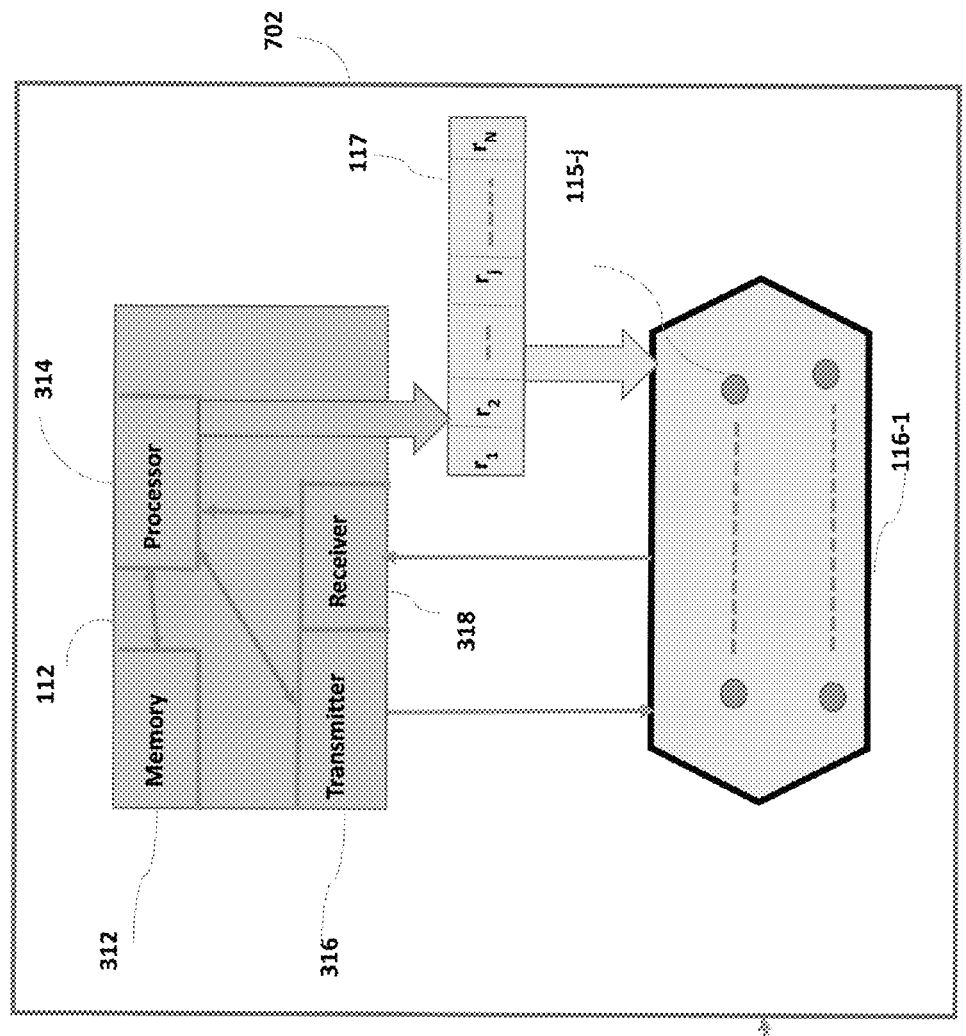
FIG. 7A illustrates one embodiment of the apparatus used to calibrate the drone antenna sub-system.
Figure 7A:
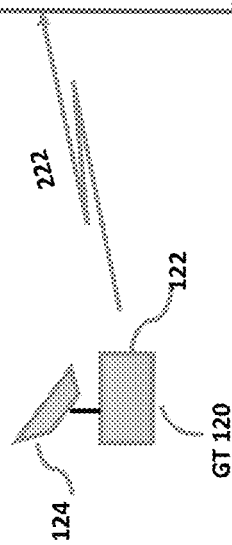

First, we discuss the drone receive antenna element calibration. FIG. 7A shows one aperture 116-1 of the drone antenna sub-system. GT 120 is chosen as the reference GT for the purpose of drone antenna sub-system 114 receive antenna calibration. Each antenna element 115-j ($1<j>N$, N number of antenna elements) is adjusted using a coefficient 117-$r_j$. As will be described below, 117-$r_j$ is computed by the drone radio sub-system 112 and sent to drone antenna aperture 116-1 to be applied to element 115-j. GT 120 sends a signal 222 on which the drone radio sub-system 112 makes signal quality measurements such as SINR (Signal to Interference plus Noise Ratio) to use for calibration purposes. Based on the changes in the received SINR relative to the SINR measurement for the previous set of coefficients 117-$r_j$, the antenna element receive coefficients 117-$r_j$ are updated according to well-known adaptive optimization schemes such as the steepest decent method maximizing a criterion such as SINR. Next, the updated coefficients 117-$r_j$ are applied to the antenna elements 115-j. This process of GT 120 sending signal 222, drone radio sub-system 112 measuring the signal quality and computing new set of coefficients 117-$r_j$ and applying the coefficients to antenna elements 115-j continues until the receive antenna coefficients have converged according to the optimization criterion. Note that during the calibration process the coefficients were computed for the actual position of the drone and its orientation. Therefore, during the subsequent data transmission phase, the drone radio sub-system should make appropriate adjustments to the coefficients 117-$r_j$ by taking into account the real time position and orientation coordinates of the drone from gyroscope/accelerometer readings. During the calibration process, drone radio sub-system measures the drone's orientation with respect to the GT using accelerometer/gyroscope readings and records the drone's position and orientation coordinates at the end of the calibration process to be used as drone's reference position/orientation for sub-sequent coefficient adjustments.

If the drone antenna sub-system steers its beam mechanically then drone antenna sub-system can mechanically move its beam in steps, make SINR measurements for each step to find the best antenna mechanical position.

Figure 8:
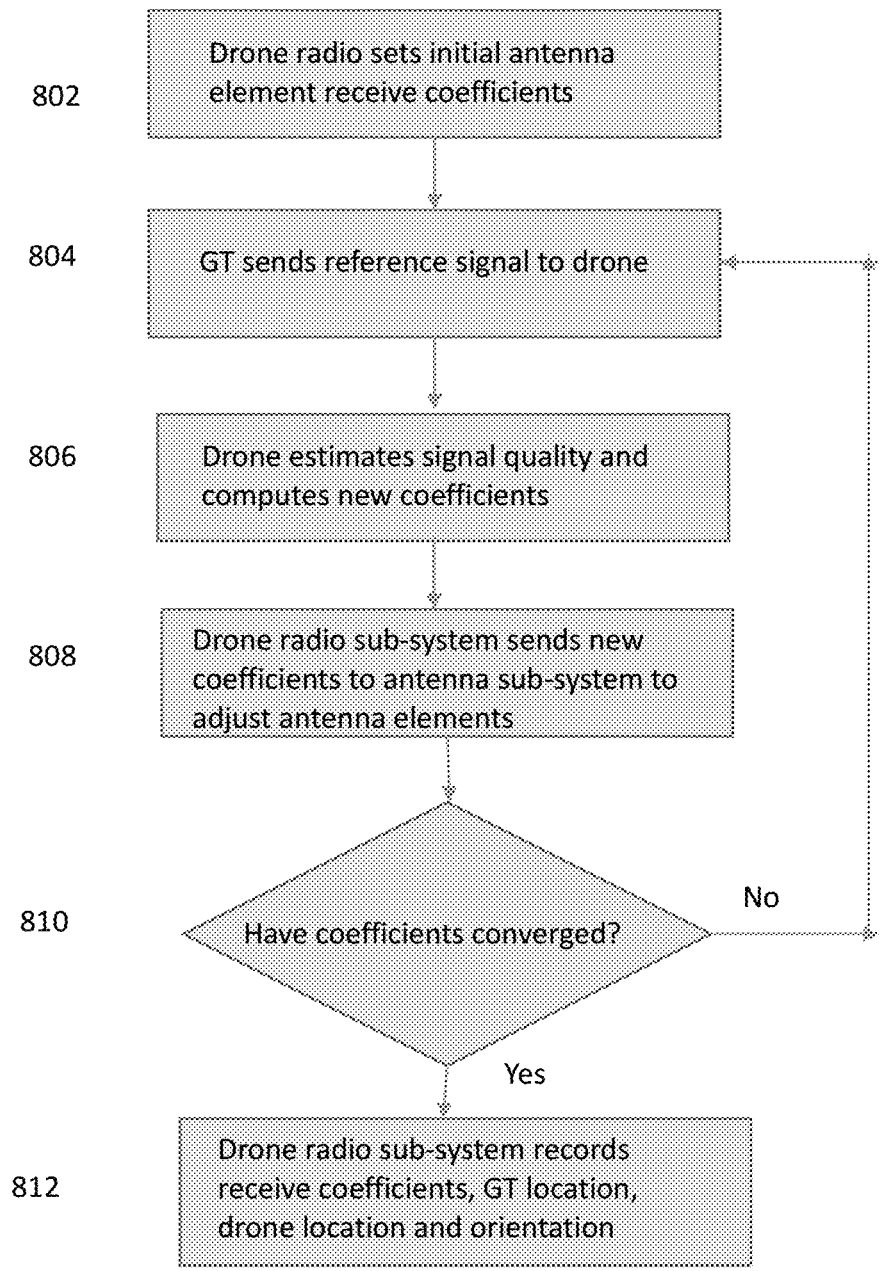
FIG. 8 shows a process to calibrate drone's receive antenna elements.

FIG. 8 is a flow chart for adaptively adjusting the drone radio sub-system antenna element receive coefficients. In step 802, drone radio sub-system sets the initial receive coefficients based on the locations of the drone and the GT. GT sends a reference signal in step 804 to the drone. In step 806, drone's radio sub-system estimates a signal quality metric such as SINR and uses an adaptive filtering algorithm such as the steepest decent to adjust the receive coefficients according to an optimization metric such as minimizing MMSE (Minimum Mean Squared Error) of some signal quality metric or maximizing SINR. In step 808, drone radio system sends the coefficients to the drone antenna to adjust the antenna elements. In step 810, drone radio sub-system verifies if the signal quality metric is within a threshold, i.e. if the receive coefficients have converged. If coefficients have converged, then in step 812 drone radio sub-system records the coefficients, the drone's position coordinates, drone's orientation toward the GT such as roll, pitch and yaw at the time of calibration, as well as the position coordinates of the GT that was used for calibration. If the coefficients have not converged in step 810, then the process moves back to step 804.

Figure 7B:
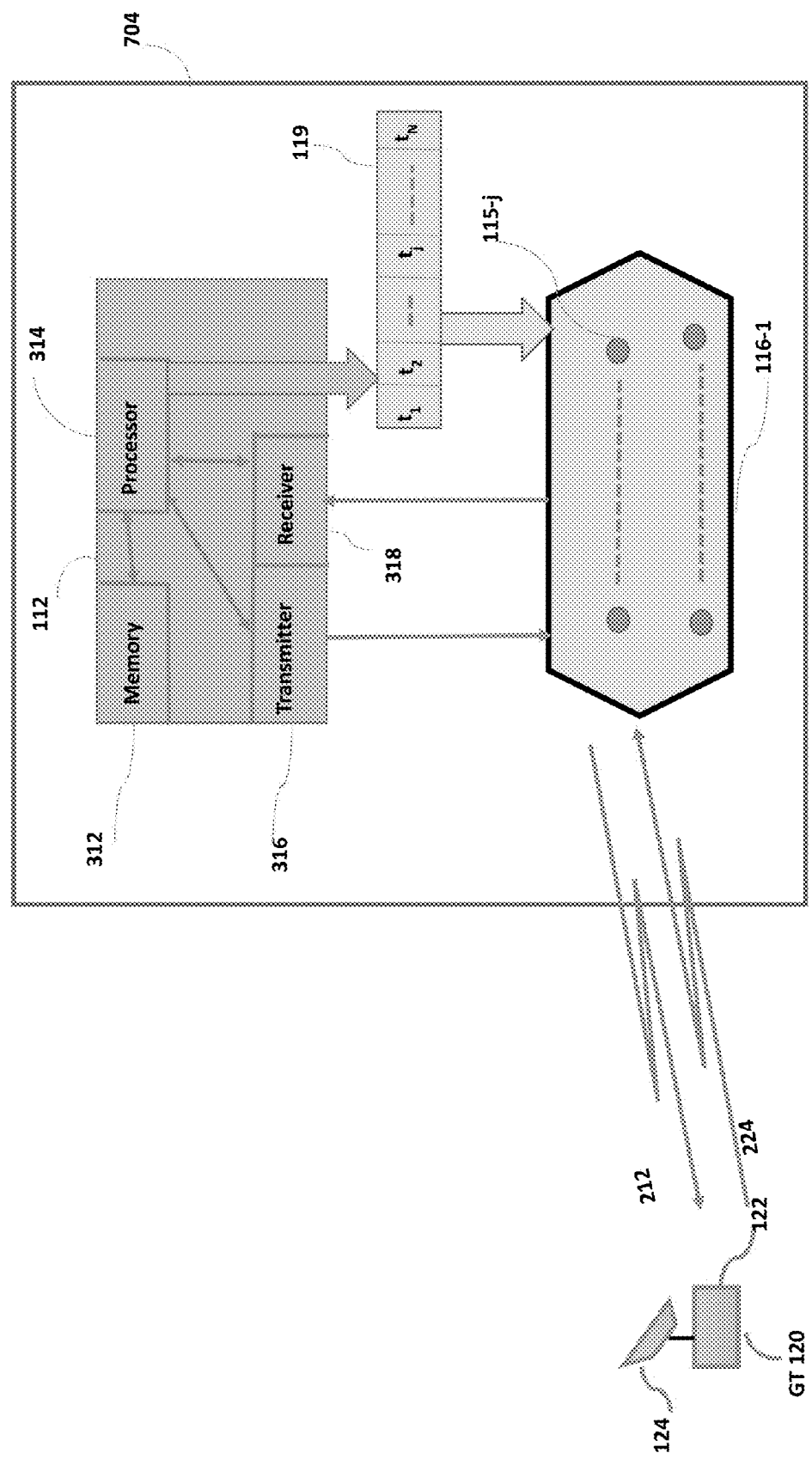
FIG. 7B illustrates another embodiment of the apparatus used to calibrate the drone antenna sub-system.

Per FIG. 7B, the drone antenna sub-system antenna element transmit coefficients 119-$t_j$ may be calibrated in real time as follows. The drone antenna aperture 116 forms a transmit beam using an initial set of transmit coefficients 119-$t_j$, and transmits a reference/pilot signal 212 to GT 120. GT 120 makes SINR or some other signal quality measurement using the reference/pilot signal 212. GT 120 sends the measured SINR or another signal quality metric in a message 224 back to the drone radio sub-system 112. Similar to the receive antenna element coefficient optimization, drone's radio sub-system unit 112 uses the measured signal quality reported by GT 120 to perturb the drone antenna sub-system antenna element transmit coefficients 119-$t_j$. Coefficient perturbation are computed using well-known adaptive optimization algorithms such as the steepest decent scheme. The above process of the drone radio sub-system sending a signal, GT making signal quality measurements and sending the measurements back to the drone, and the drone antenna sub-system adjusting its antenna element transmit coefficients continues until the transmit coefficients have converged to "optimal" values according to some performance metric such as maximizing SINR. During the time drone antenna sub-system 112 is calibrating its antenna coefficients, the GT 120 antenna sub-system should keep its beam fixed to avoid introducing an additional variable for the drone antenna sub-system calibration process.

During the calibration measurement time interval, drone radio sub-system keeps track of the drone's orientation using accelerometer/gyroscope measurements. Drone radio sub-system records the drone's position coordinates and drone's orientation such as roll, pitch and yaw toward the GT, as well as the optimal set of transmit and receive antenna element coefficients. During data transmission to a GT, drone radio sub-system measures the drones orientation with respect to the GT using accelerometer/gyroscope readings and adjusts the antenna element coefficients based on calibrated coefficients and the drone's position and orientation, as well as the position coordinates of the GT that was used for calibration.

Figure 9:
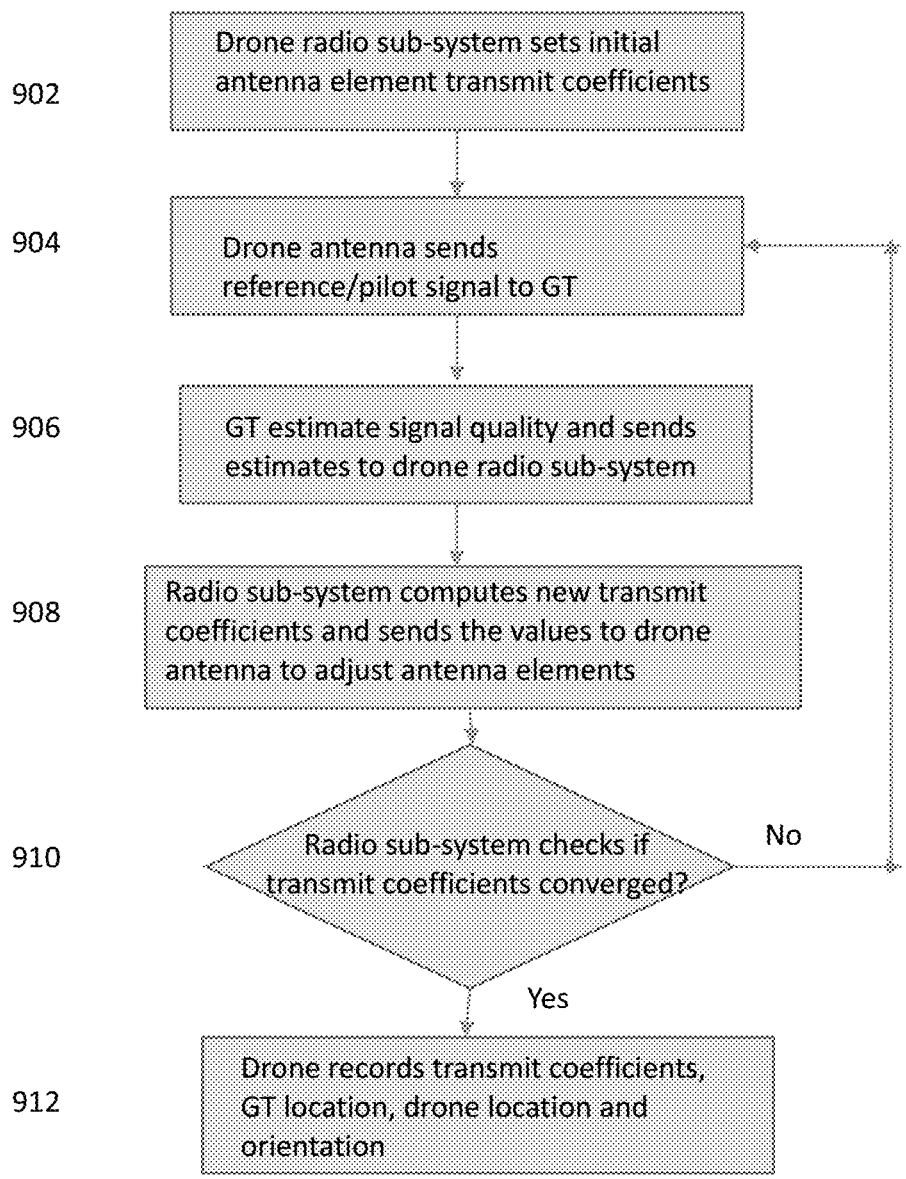
FIG. 9 shows a process to calibrate drone's transmit antenna elements according to one aspect of the disclosure.

FIG. 9 is a flow chart for adaptively adjusting the drone radio sub-system antenna element transmit coefficients. In step 902, drone antenna sub-system sets the initial transmit coefficients based on the locations of the drone and the GT. Drone antenna sub-system sends a reference/pilot signal in step 904 to the GT. In step 906, GT's radio sub-system estimates a signal quality metric such as SINR, and sends the measured signal quality value back to the drone. In step 908, drone radio sub-system uses an adaptive filtering algorithm such as the steepest decent to adjust the transmit coefficients according to an optimization metric such as MMSE (Minimum Mean Squared Error) of the signal quality metric. In step 910, drone radio sub-system verifies if the signal quality metric is within a threshold, i.e. if the transmit coefficients have converged. If coefficients have converged, then in step 912 drone radio sub-system records the coefficients, the drone's position coordinates, drone's orientation toward the GT such as roll, pitch and yaw at the time of calibration, as well as the position coordinates of the GT that was used for calibration. If the coefficients have not converged in step 910, then the process moves back to step 904.

The GT antenna sub-system may calibrate its antenna element coefficients using the same method and apparatus as that used by the drone antenna sub-system, but with the roles of GT and drone reversed in each step. GT radio sub-system measures a received signal quality metric such as SINR when receiving data or any other signal from the drone radio sub-system. GT radio sub-system uses the measured signal quality values to adaptively adjust the antenna element receive coefficients using the same optimization approach as that used for the drone antenna sub-system mentioned above. To calibrate the GT antenna sub-system transmit antenna element coefficients, the GT radio sub-system and drone radio sub-system agree to a period of calibration. The GT antenna sub-system transmit antenna element coefficient optimization is also the same as that described above for the drone antenna sub-system. During the calibration period the GT antenna sub-system makes perturbations in the antenna element transmit coefficients while transmitting a signal to the drone. The drone radio sub-system measures a signal quality metric such as SINR on the received signal from the GT radio sub-system and sends the measured metric back to the GT radio sub-system. GT radio sub-system uses the reported signal quality metric measurement from the drone radio sub-system to determine the successive coefficient perturbations using well-known adaptive optimization algorithms such as the steepest decent scheme. Therefore, flow charts of FIGS. 9 and 10 apply to calibration of GT antenna element transmit and receive coefficients but in each step GT is replaced by drone, and drone is replaced by GT.

Note that receive antenna element coefficient calibration is only needed if the beam forming on the receive side is carried out in analog domain. However, if the received signal on each antenna element is digitized at the receiver and digitized samples of each antenna element is sent to a baseband processor then optimal beam forming may be implemented digitally by estimating the best combining coefficients using well-known algorithms such as the MMSE (Minimum Mean Squared Estimate).

Figure 7C:
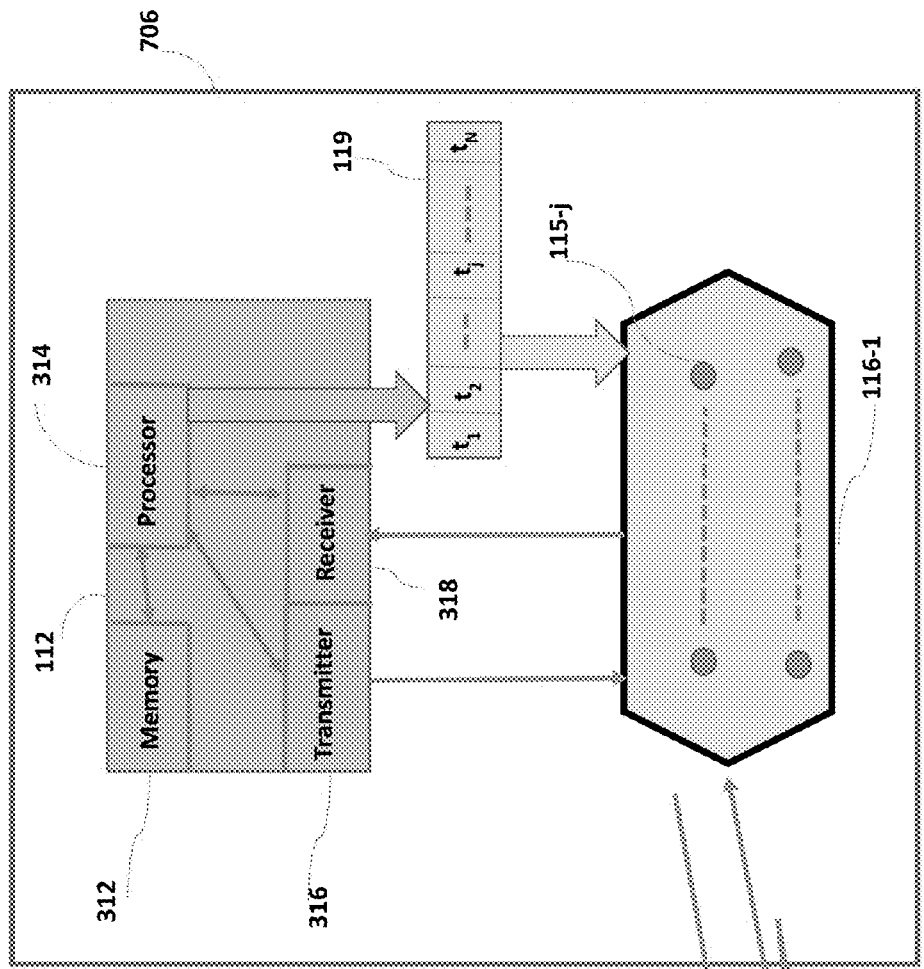
FIG. 7C illustrates yet another embodiment of the apparatus used to calibrate the drone antenna sub-system.
Figure 7C:
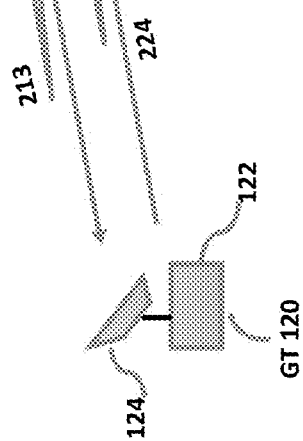

Another approach to calibrating antenna element transmit coefficients for the drone antenna sub-system and GT antenna sub-system is described next per FIG. 7C. A calibration time interval is agreed upon between the GT radio sub-system and the drone radio sub-system. We first describe the mechanism for calibrating the drone antenna drone antenna sub-system 114. During the calibration period, drone radio sub-system 112 transmits a reference signal 213 on each drone antenna element 115-j toward GT 120, one element at a time. The GT radio sub-system 122 estimates the overall channel gain and phase which includes the effects of the drone transmit RF chain, the propagation path and the receive RF chain at the GT radio sub-system. GT radio sub-system 122 then sends back the estimated channel gain and phase back to the drone radio sub-system in a message 224. Drone radio sub-system 112 can then use the knowledge of the channel gain/phase for each transmit antenna element, received in messages 224, to calibrate the transmit beam forming coefficients in order to place the beam bore sight at the desired location on the ground. There is no iterative optimization process in the transmit antenna element calibration scheme just described. Since the reference signal is sent on each antenna element, one at a time, then the transmit signal does not benefit from the antenna aperture gain factor and has a smaller EIRP (Effective Isotropic Radiated Power). Therefore, the reference/pilot signal may be sent long enough in time duration so that the receiver may integrate the signal to obtain enough processing gain to compensate for the transmit aperture antenna gain loss. Also, it may be advantageous to send the calibration reference signal in certain parts of the spectrum using a relatively narrowband waveform in order to avoid interfering with regular data transmission sessions and avoid losing system capacity. The calibration of GT antenna sub-system transmit antenna elements follows the same procedure as above but by reversing the roles of drone and GT sub-systems in each step. In FIGS. 7A, 7B, and 7C, only one antenna fixture is shown on the drone. As was discussed previously, drone may have multiple antenna fixtures. In that case, the calibration processes discussed above may be repeated for each of the antenna fixtures of the drone.

Figure 10:
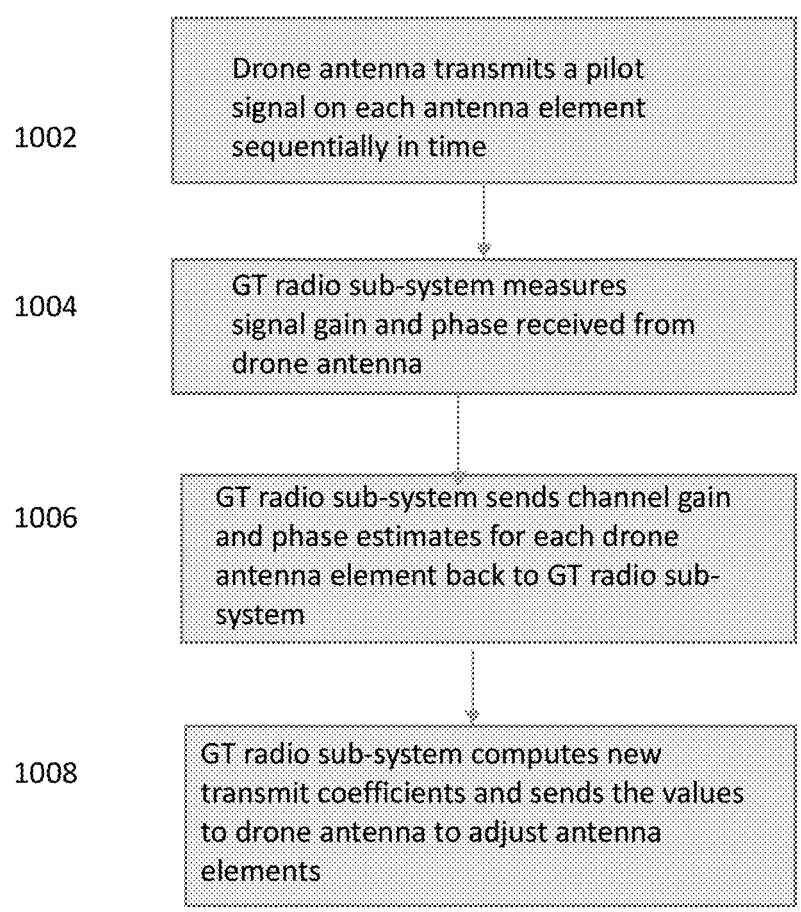
FIG. 10 shows a process to calibrate drone's transmit antenna elements according to one aspect of the disclosure.

Flow chart 1100 in FIG. 10 shows the steps in calibrating the drone antenna element transmit coefficients according to apparatus of FIG. 7C. In step 1002, drone radio sub-system sends a reference/pilot signal on each transmit antenna element one at a time in a sequence. In step 1004, GT radio sub-system measures the channel gain and phase for the signals received from different antenna elements of the drone antenna sub-system. GT radio sub-system in step 1006 sends a message to the drone radio sub-system including the channel gain and phase measurements. The drone radio sub-system in step 1008 records the channel measurements as well as the drone's position coordinates and drone's orientation such as roll, pitch and yaw. The recorded calibration information is used by the drone radio sub-system/drone antenna sub-system to set the drone transmit antenna coefficients during data transmission. During data transmission, drone radio sub-system may use the real time location of the drone as well as drone's roll, pitch and yaw information and the calibration information to determine the optimal transmit coefficients. The flow chart for calibrating the GT transmit antenna elements are the same as that of FIG. 10 but with the roles of drone and GT sub-systems reversed.

As the drone travels around the circle in its quasi-stationary position, the orientation of the drone antenna aperture that is serving a given GT changes with time. As the orientation of the drone serving antenna aperture toward the GT changes, the beam from the serving antenna aperture can be steered toward the GT electronically or mechanically. However, eventually the orientation of the serving antenna aperture toward the GT has changed so much that it will have too much scanning loss toward the GT. At this time, the drone radio sub-system will need to either use a different antenna fixture on the drone, if there are multiple antenna fixtures available, or to use a different antenna aperture on the single available antenna fixture, such as the one in FIG. 2, to form a beam toward the GT. In other words, the drone radio sub-system may need to do an antenna aperture or antenna fixture "handover" within the drone antenna sub-system. Drone radio sub-system knows the location of the GT that it is trying to serve. The drone radio sub-system also knows the orientation of the drone using accelerometer/gyroscope information. The drone radio sub-system uses information from the accelerometer/gyroscope as well as information on the antenna patterns of the drone and ground terminal antennas to determine the drone antenna aperture that provides the highest gain toward the ground terminal. The drone antenna sub-system is also, as discussed above, calibrated. Then, the drone radio sub-system determines the right antenna element coefficients to point the beam's bore sight using a different antenna fixture and/or a different antenna aperture toward the GT's location.

In the above description of the drone antenna sub-systems, and the GT antenna sub-system, we mainly referred to electronic beam forming using the different antenna elements of the antenna aperture. The individual antenna elements may be made of a variety of technologies such as patch, horn, slots, CTS (Continuous Transverse Stubs), meta-materials, and other dielectric materials. The drone system design techniques such as choosing the best drone to communicate with, pointing the drone antenna optimally toward the ground terminal, calibrating the drone antennas, steering the beam as the drone moves are applicable to any antenna element technology or material.

While this disclosure has described certain embodiments and generally associated methods, alterations and permutations of these embodiments and methods will be apparent to a PHOSITA. Accordingly, the above description of example embodiments does not define or constrain this disclosure. Other changes, substitutions, and alterations are also possible without departing from the spirit and scope of this disclosure, as defined by the following claims.

What is claimed is:

1. A method of beam forming and calibrating a broadband wireless communication between ground terminals and a network of one or more aerial platforms, comprising:
generating a plurality of beams toward the ground from a plurality of antenna fixtures on each aerial platform, forming beams toward terminals located in an area on the ground with a radius of 300 km or less, wherein the plurality of antenna fixtures are installed on different locations on the drone and configured to cover a given area on the ground even as the drone rolls, pitches and yaws;

demodulating and decoding signals received by a receiver on at least one radio sub-system on each aerial platforms from the ground terminals;

modulating data and transmitting the modulated signals to ground terminals through at least one aerial platform antenna, sending at least one pilot signal to ground terminals, and controlling and configuring the aerial platform antenna to form beams in specific directions;

pointing beams toward specific aerial platforms with an antenna sub-system at at least one of the ground terminals;

demodulating and decoding signals received from aerial platforms with a radio sub-system at the ground terminal with a receiver; and modulating ground terminal data and transmitting the signals to aerial platforms through the ground terminal antenna, sending at least one pilot signal to aerial platforms, and controlling and configuring the ground terminal antenna to form its beam toward aerial platforms.

2. The method of claim 1, further comprising calibrating the transmit antenna elements of the aerial platform antenna, comprising steps of:

transmitting a pilot signal from the aerial platform antenna through one antenna aperture of a first antenna fixture on one of said aerial platform antenna fixtures toward a reference ground terminal;

measuring at least one signal quality metric of the pilot signal received from the aerial platform with the reference ground terminal, sending the measured aerial platform pilot signal quality to the aerial platform; and updating the coefficients of the transmit antenna elements with the aerial platform using pilot signal quality measurements received from the reference ground terminal to optimize at least one signal quality metric of the pilot signal received at the reference ground terminal from the aerial platform.

3. The method of claim 1, further comprising calibrating the transmit antenna elements of the aerial platform antenna, comprising steps of:

transmitting a pilot signal on each element of the antenna aperture of the aerial platform antenna, one element at a time, toward a reference ground terminal;

measuring the amplitude and phase of the pilot signal received from the aerial platform with the reference ground terminal, and sending the measured aerial platform pilot signal amplitude and phase to the aerial platform; and using the amplitude and phase information received from the reference ground terminal with the aerial platform to calibrate the transmit antenna elements.

4. The method of claim 1, further comprising calibrating the receive antenna elements of the aerial platform antenna, comprising steps of:

receiving a signal from one of said ground terminals by the aerial platform, and measuring at least one signal quality metric of the received signal; and updating the receive antenna element coefficients based on an optimization criterion.

5. The method of claim 1, further comprising calibrating the transmit antenna elements of the ground terminal antenna, comprising steps of:

transmitting a pilot signal through one antenna aperture of a first antenna fixture on one of said ground terminals toward a aerial platform;

measuring at least one signal quality metric of the pilot signal received from said ground terminal with the aerial platform, and sending the measured aerial platform pilot signal quality to said ground terminal; and updating the coefficients of the ground terminal transmit antenna elements using pilot signal quality measurements received from the aerial platform to optimize at least one signal quality aspect of the pilot signal received at the aerial platform from the ground terminal.

6. The method of claim 1, further comprising calibrating the transmit antenna elements of the ground terminal antenna, comprising steps of:

transmitting a pilot signal through each element of the ground terminal antenna aperture, one element at a time, toward a reference aerial platform;

measuring the amplitude and phase of the pilot signal received from the ground terminal by the reference aerial platform, and sending the measured aerial platform pilot signal amplitude and phase to the ground terminal; and using the amplitude and phase information received from the reference aerial platform by the ground terminal to calibrate the transmit antenna elements.

7. The method of claim 1, further comprising calibrating the receive antenna elements of the ground terminal, comprising steps of:

receiving a signal from the aerial platform by the ground terminal, and measuring at least one signal quality metric of the received signal; and updating the receive antenna element coefficients based on an optimization criterion.

8. The method of claim 1, further comprising modulating a waveform to transmit to ground terminals comprising steps of:

dividing the waveform into time slots, and assigning some of the time slots for signaling messages and the remaining time slots for data transmission; and inserting a pilot signal in each time slot for signal quality measurement by the ground terminals.

9. The method of claim 8, further comprising steps of:

estimating a signal quality metric on the downlink signal received from the aerial platform by the ground terminal, to determine the highest data rate the aerial platform may transmit, and the ground terminal radio sub-system to decode correctly; and sending the index of the determined data rate to the aerial platform on the uplink channels.

10. The method of claim 1, further comprising a method of the ground terminals to divide the available uplink spectrum into a number of frequency channels, comprising steps of:

modulating a waveform for each frequency channel, to assign some of the frequency channels for sending signal messages to aerial platforms using a random multiple access scheme, and to assign the remaining channels for sending data to aerial platforms; and inserting a pilot signal in each frequency channel for signal quality measurement by the aerial platform.

11. The method of claim 10, further comprising the step of synchronizing the uplink transmission to arrive at the aerial platform time aligned.

12. The method of claim 1, comprising steps of:

dividing the waveform into time slots, and assigning some of the time slots for signaling messages and remaining time slots for data transmission; and inserting a pilot signal in each time slot for signal quality measurement by the aerial platforms.

13. The method of claim 12, further comprising the steps of:
  estimating a signal quality metric on the uplink signal received from each of the ground terminals by the aerial platform, to determine the highest data rate the ground terminal may transmit, and the aerial platform radio sub-system to decode correctly; and
  sending the index of the determined data rate to the respective ground terminals on the downlink channel.

14. The method according to claim 13, wherein said signal quality metric on the uplink signal received from ground terminals is SINR.

15. The method according to claim 13, wherein said signal quality metric on the downlink signal received from ground terminals is SINR.

* * * * *